(12) United States Patent
Brigg

(10) Patent No.: US 11,244,421 B2
(45) Date of Patent: Feb. 8, 2022

(54) MEMORY FOR STORING UNTRANSFORMED PRIMITIVE BLOCKS

(71) Applicant: Imagination Technologies Limited, Kings Langley (GB)

(72) Inventor: Robert Brigg, Watford (GB)

(73) Assignee: Imagination Technologies Limited, Kings Langley (GB)

( * ) Notice: Subject to any disclaimer, the term of this patent is extended or adjusted under 35 U.S.C. 154(b) by 0 days.

(21) Appl. No.: 16/775,981

(22) Filed: Jan. 29, 2020

(65) Prior Publication Data

US 2020/0242725 A1   Jul. 30, 2020

(30) Foreign Application Priority Data

Jan. 29, 2019 (GB) ...................................... 1901215
Jan. 29, 2019 (GB) ...................................... 1901216

(51) Int. Cl.
*G06T 1/20*         (2006.01)
*G06T 1/60*         (2006.01)
(Continued)

(52) U.S. Cl.
CPC ............ *G06T 1/60* (2013.01); *G06F 9/30018* (2013.01); *G06F 9/30029* (2013.01);
(Continued)

(58) Field of Classification Search
CPC ......... G09G 2340/02; G06T 1/20; G06T 1/60; G06T 9/00; G06T 11/40; G06T 15/005;
(Continued)

(56) References Cited

U.S. PATENT DOCUMENTS

| 5,652,864 A | 7/1997 | Hine |
| 8,736,607 B1 | 5/2014 | Fishwick |

(Continued)

FOREIGN PATENT DOCUMENTS

| GB | 2458488 A | 9/2009 |
| GB | 2500284 A1 | 9/2013 |

(Continued)

*Primary Examiner* — Jacinta M Crawford
(74) *Attorney, Agent, or Firm* — Potomac Law Group, PLLC; Vincent M DeLuca

(57) ABSTRACT

Memories and methods for storing untransformed primitive blocks of variable size in a memory structure of a graphics processing system, the untransformed primitive blocks having been generated by geometry processing logic of the graphics processing system. The method includes: storing an untransformed primitive block in the memory structure, and increasing, by a predetermined amount, a current total amount of memory allocated for storing untransformed primitive blocks; determining an unused amount of the current total amount of memory allocated for storing untransformed primitive blocks; receiving a new untransformed primitive block for storing in the memory structure, and determining whether a size of the new untransformed primitive block is less than or equal to the unused amount; and if it is determined that the size of the new untransformed primitive block is less than or equal to the unused amount, storing the new untransformed primitive block in the memory structure.

19 Claims, 14 Drawing Sheets

(51) Int. Cl.
*G06F 9/30* (2018.01)
*G06T 17/10* (2006.01)
*G06T 15/00* (2011.01)

(52) U.S. Cl.
CPC ............ *G06F 9/30145* (2013.01); *G06T 1/20* (2013.01); *G06T 15/005* (2013.01); *G06T 17/10* (2013.01)

(58) Field of Classification Search
CPC . G06T 17/10; G06F 9/30018; G06F 9/30029; G06F 9/30145; G06F 12/023; G06F 2212/401
USPC .................................................. 345/531, 543
See application file for complete search history.

(56) References Cited

U.S. PATENT DOCUMENTS

| | | |
|---|---|---|
| 9,478,002 B2 | 10/2016 | Yang |
| 9,569,454 B2 | 2/2017 | Ebsen et al. |
| 9,953,456 B2 | 4/2018 | Howson |
| 2001/0015820 A1 | 8/2001 | Conrad et al. |
| 2004/0015662 A1* | 1/2004 | Cummings ........... G06F 3/0679 711/154 |
| 2006/0069898 A1* | 3/2006 | Patel ..................... G06F 12/023 711/171 |
| 2009/0066694 A1* | 3/2009 | Redshaw ................ G06T 15/06 345/423 |
| 2014/0229701 A1 | 8/2014 | Jacquet |
| 2015/0348306 A1 | 12/2015 | Yang et al. |
| 2017/0069132 A1 | 3/2017 | Howson et al. |
| 2017/0315928 A1 | 11/2017 | Hangud et al. |

FOREIGN PATENT DOCUMENTS

| | | |
|---|---|---|
| GB | 2526598 A | 12/2015 |
| KR | 100859651 B1 | 9/2008 |
| WO | 02/23341 A1 | 3/2002 |

* cited by examiner

MEMORY FOR STORING UNTRANSFORMED PRIMITIVE BLOCKS

BACKGROUND

Graphics processing systems are configured to receive graphics data, e.g. from an application (e.g. a game application) running on a computer system, and to render an image from the graphics data to provide a rendering output. For example, an application may generate a 3D model of a scene and output geometry data representing the objects in the scene. In particular, the application may divide each object into a plurality of primitives (i.e. simple geometric shapes, such as, but not limited to rectangles, triangles, lines and points to which a texture can be applied) which are defined by the position of one or more vertices. In these cases, the geometry data output by the application may include information identifying each vertex (e.g. the coordinates of the vertex in world space) and information indicating the primitives formed by the vertices. The graphics processing system then converts the received geometry data into an image that may be displayed on the screen.

A graphics processing system may, for example, implement immediate mode rendering (IMR) or tile-based rendering (TBR). In IMR the entire scene is rendered as a whole. In contrast, in TBR a scene is rendered using a rendering space which is divided into subsections, which are referred to as tiles, wherein at least a portion of the rendering process may be performed independently for each tile. The tiles may have any suitable shape, but are typically rectangular (wherein the term "rectangular" includes square). An advantage of TBR is that fast, on-chip memory can be used during the rendering for colour, depth and stencil buffer operations, which allows a significant reduction in system memory bandwidth over IMR, without requiring on-chip memory that is large enough to store data for the entire scene at the same time.

TBR involves two key phases: a geometry processing phase; and a rasterization phase. During the geometry processing phase the geometry data (e.g. vertices defining primitives) received from an application (e.g. a game application) is transformed from world space coordinates into rendering space coordinates (e.g. screen space coordinates). A per-tile list is then created of the transformed primitives (e.g. triangles) that fall at least partially within the bounds of the tile. During the rasterization phase each tile is rendered separately (i.e. the transformed primitives are mapped to pixels and the colour is identified for each pixel in the tile). This may comprise identifying which primitive(s) are visible at each pixel. The colour of each pixel may then be determined by the appearance of the visible primitive(s) at that pixel which may be defined by a texture applied at that pixel and/or the pixel shader program run on that pixel. A pixel shader program describes operations that are to be performed for given pixels. Rendering each tile separately enables the graphics processing system to only retrieve the transformed primitive data related to a particular tile when rendering that tile in the rasterization phase, which keeps bandwidth requirements for the memory (e.g. intermediate buffer) to a minimum. Once a colour value has been identified for each pixel the colour values are written out to memory (e.g. a frame buffer) until the entire scene has been rendered. Once the entire scene has been rendered the scene may be, for example, displayed on a screen.

FIG. 1 illustrates an example TBR graphics processing system 100. The system 100 comprises memory $102_1$, $102_2$, $102_3$, $102_4$, geometry processing logic 104 and rasterization logic 106. Two or more of the memories $102_1$, $102_2$, $102_3$, $102_4$ may be implemented in the same physical unit of memory.

The geometry processing logic 104 implements the geometry processing phase of TBR. The geometry processing logic 104 comprises transformation logic 108 and a tiling engine 110. The transformation logic 108 receives geometry data (e.g. vertices, primitives and/or patches) from an application (e.g. a game application) and transforms the geometry data into the rendering space (e.g. screen space). The transformation logic 108 may also perform functions such as clipping and culling to remove geometry data (e.g. primitives or patches) that falls outside of a viewing frustum, and/or apply lighting/attribute processing as is known to those of skill in the art. The transformed geometry data (e.g. vertices, primitives and/or patches) is (i) stored in the memory $102_2$, and (ii) provided to the tiling engine 110. The tiling engine 110 generates, from the transformed geometry data, a list, for each tile, of the transformed primitives that fall, at least partially, within that tile. The list may be referred to as a display list or a transformed display list. In some cases, the transformed display lists comprise pointers or links to the transformed geometry data (e.g. vertex data) related to the primitives that, at least partially, fall within the tile.

The rasterization logic 106 implements the rasterization phase of TBR. Specifically, the rasterization logic 106 renders the primitives in a tile-by-tile manner by fetching the display list for a tile from memory $102_3$ and then fetching the transformed geometry data from memory $102_2$ for the primitives that fall within the tile as indicated by the display list for that tile; and rendering the primitives for that tile based on the transformed geometry data.

In some cases, the rasterization logic 106 may comprise fetch logic 112, hidden surface removal (HSR) logic 114 and texturing/shading logic 116. In these cases, the fetch logic 112 fetches each of the display lists from memory $102_3$ and for each display list fetches the transformed geometry data from memory $102_2$ for the primitives that fall within a tile as specified by the corresponding display list. The transformed geometry data for a particular tile is then provided to the HSR logic 114 which rasterizes the transformed geometry data (e.g. by performing scan conversion) to generate primitive fragments and then removes primitive fragments which are hidden (e.g. hidden by other primitive fragments). The term "fragment" is used herein to mean a sample of a primitive at a sampling point, which is to be processed to render pixels of an image. In some examples, there may be a one-to-one mapping of pixels to fragments. However, in other examples there may be more fragments than pixels, and this oversampling can allow for higher quality rendering of pixel values, e.g. by facilitating anti-aliasing and other filters that may be applied to multiple fragments for rendering each of the pixel values.

The remaining fragments (after hidden surface removal) are then passed to the texturing/shading logic 116 which performs texturing and/or shading on the primitive fragments to determine pixel values of a rendered image. The rendered pixel values for a tile are then stored in memory $102_4$ (e.g. frame buffer).

The rasterization logic 106 processes each of the tiles and when the whole image has been rendered and stored in the memory $102_4$ (e.g. frame buffer) the image can be output from the graphics processing system 100 and used in any suitable manner, for example, displayed on a display, stored in memory, or transmitted to another device, etc. The TBR graphics processing system 100 shown in FIG. 1 is a "deferred" rendering system in the sense that fragments are processed by the HSR logic 114 before being processed by the texturing/shading logic 116. In other examples, the graphics processing system might not be a deferred rendering system in which case texturing/shading would be applied to fragments before HSR is applied to those fragments.

In many cases, the transformed geometry data can be quite large. This is particularly true where there is a large expansion ratio (e.g. when tessellation is performed by the transformation logic 108) between the untransformed geometry data and the transformed geometry data.

Accordingly, as described in UK Published Patent Applications GB2458488 and GB2542133 some TBR graphics processing systems use "untransformed display lists" that indicate which untransformed primitives (once transformed) will fall, at least partially, within the bounds of each tile. As such, the untransformed display lists refer to untransformed primitives as opposed to transformed primitives. For example the untransformed display lists may comprise pointers or links to the untransformed geometry data (e.g. vertex data) related to the untransformed primitives that, when transformed, will, at least partially, fall within the tile. This means that the transformed geometry data does not need to be provided from the geometry processing logic 104 to the memory $102_2$, or stored in the memory $102_2$. However, in these systems the untransformed geometry data referred to in the untransformed display lists is transformed again in the rasterization phase. Although this means that the geometry data is transformed twice in some cases, the benefits of avoiding the delay and memory usage of transferring the transformed geometry data to memory and storing it may outweigh the processing costs of performing a transformation in the rasterization phase.

FIG. 2 illustrates an example TBR graphics processing system 200 that uses untransformed display lists, similar to that described in GB2458488 and GB2542133, which may be referred to as an untransformed display list (UDL) graphics processing system. The system 200 is similar to the system 100 shown in FIG. 1 except (i) the transformed geometry data is not written to memory by the geometry processing logic; (ii) the display lists, instead of identifying the transformed primitives which fall within each tile, identify the untransformed primitives, which when transformed, will fall within each tile; and (iii) the rasterization logic includes transformation logic to re-transform the untransformed primitives referred to in the untransformed display lists. The system 200, like the system 100 shown in FIG. 1, comprises memory $202_1$, $202_3$, $202_4$, geometry processing logic 204 and rasterization logic 206.

The geometry processing logic 204, like the geometry processing logic 104 shown in FIG. 1, implements the geometry processing phase of TBR. The geometry processing logic 204 shown in FIG. 2 comprises transformation logic 208 and a tiling engine 210. The transformation logic 208 receives geometry data (e.g. vertices and primitives) from an application (e.g. a game application) and transforms the geometry data into the rendering space (e.g. screen space). The transformation logic 208 may also perform functions such as clipping and culling to remove geometry data (e.g. primitives) that falls outside of a viewing frustum. In contrast to the transformation logic 108 shown in FIG. 1, the transformation logic 208 shown in FIG. 2 might not apply lighting/attribute processing as only the position information is used by the geometry processing logic 204. The transformed geometry data (e.g. vertices and primitives) is provided to the tiling engine 210. The tiling engine 210 generates, from the transformed geometry data, a list, for each tile, of the untransformed primitives that, when transformed, fall, at least partially, within that tile. The lists that are generated by the tiling engine 201 shown in FIG. 2 may be referred to as untransformed display lists as they refer to untransformed geometry data as opposed to transformed geometry data.

The rasterization logic 206 shown in FIG. 2, like the rasterization logic 106 shown in FIG. 1, implements the rasterization phase of TBR. Specifically, the rasterization logic 206 renders the primitives in a tile-by-tile manner by fetching the untransformed geometry data for the primitives that fall within a tile as indicated by the untransformed display list for that tile, transforming the untransformed geometry data for that tile, and rendering the primitives for that tile based on the transformed geometry data.

In some cases, the rasterization logic 206 may comprise fetch logic 212, transformation logic 213, hidden surface removal (HSR) logic 214, and texturing/shading logic 216. In these cases, the fetch logic 212 fetches each of the untransformed display lists from memory $202_3$ and for each untransformed display list fetches the untransformed geometry data identified therein from memory $202_1$. The untransformed geometry data for a particular tile is then provided to the transformation logic 213 which transforms the untransformed geometry data (e.g. primitives) into the rendering space (e.g. screen space). The transformed geometry data for a particular tile is then provided to the HSR logic 214 which rasterizes the transformed geometry data (e.g. by performing scan conversion) to generate primitive fragments and then removes primitive fragments which are hidden (e.g. hidden by other primitive fragments). The remaining fragments (after hidden surface removal) are then passed to the texturing/shading logic 216 which performs texturing and/or shading on the primitive fragments to determine pixel values of a rendered image which can be passed to the memory $202_4$ (e.g. frame buffer) for storage.

The embodiments described below are provided by way of example only and are not limiting of implementations which solve any or all of the disadvantages of known UDL graphics processing systems.

SUMMARY

This summary is provided to introduce a selection of concepts that are further described below in the detailed description. This summary is not intended to identify key features or essential features of the claimed subject matter, nor is it intended to be used to limit the scope of the claimed subject matter.

Described herein are memories and methods for storing untransformed primitive blocks of variable size in a memory structure of a graphics processing system, the untransformed primitive blocks having been generated by geometry processing logic of the graphics processing system. The method includes: storing an untransformed primitive block in the memory structure, and increasing, by a predetermined amount, a current total amount of memory allocated for storing untransformed primitive blocks; determining an unused amount of the current total amount of memory allocated for storing untransformed primitive blocks; receiving a new untransformed primitive block for storing in the memory structure, and determining whether a size of the new untransformed primitive block is less than or equal to the unused amount; and if it is determined that the size of the new untransformed primitive block is less than or equal to the unused amount, storing the new untransformed primitive block in the memory structure.

A first aspect provides a method of storing untransformed primitive blocks of variable size in a memory structure of a graphics processing system, the untransformed primitive blocks having been generated by geometry processing logic of the graphics processing system, the method comprising: storing an untransformed primitive block in the memory structure, and increasing, by a predetermined amount, a current total amount of memory allocated for storing untransformed primitive blocks; determining an unused amount of the current total amount of memory allocated for storing untransformed primitive blocks; receiving a new untransformed primitive block for storing in the memory structure, and determining whether a size of the new untransformed primitive block is less than or equal to the unused amount; and if it is determined that the size of the new untransformed primitive block is less than or equal to the unused amount, storing the new untransformed primitive block in the memory structure.

A second aspect provides a memory for use in a graphics processing system for storing untransformed primitive blocks of variable size, the untransformed primitive blocks having been generated by geometry processing logic of the graphics processing system, the memory comprising: a memory module for storing untransformed primitive blocks; a memory controller configured to: cause an untransformed primitive block to be stored in the memory module, and increase a total amount of memory allocated for storing untransformed primitive blocks by a predetermined amount: determine an unused amount of the current total amount of memory allocated for storing untransformed primitive blocks; determine whether a size of a new untransformed primitive block is less than or equal to the unused amount; and if it is determined that the size of the new untransformed primitive block is less than or equal to the unused amount, cause the new untransformed primitive block to be stored in the memory module.

A third aspect provides a graphics processing system comprising the memory of the second aspect.

The graphics processing systems and memories described herein may be embodied in hardware on an integrated circuit. There may be provided a method of manufacturing, at an integrated circuit manufacturing system, the graphics processing systems and memory described herein. There may be provided an integrated circuit definition dataset that, when processed in an integrated circuit manufacturing system, configures the system to manufacture the graphics processing systems and memories described herein. There may be provided a non-transitory computer readable storage medium having stored thereon a computer readable description of a graphics processing system or memory described herein that, when processed in an integrated circuit manufacturing system, causes the integrated circuit manufacturing system to manufacture an integrated circuit embodying the graphics processing system or memory.

There may be provided an integrated circuit manufacturing system comprising: a non-transitory computer readable storage medium having stored thereon a computer readable description of a graphics processing system or memory described herein; a layout processing system configured to process the computer readable description so as to generate a circuit layout description of an integrated circuit embodying the graphics processing system or memory and an integrated circuit generation system configured to manufacture the graphics processing system or the memory according to the circuit layout description.

There may be provided computer program code for performing a method as described herein. There may be provided non-transitory computer readable storage medium having stored thereon computer readable instructions that, when executed at a computer system, cause the computer system to perform the methods as described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
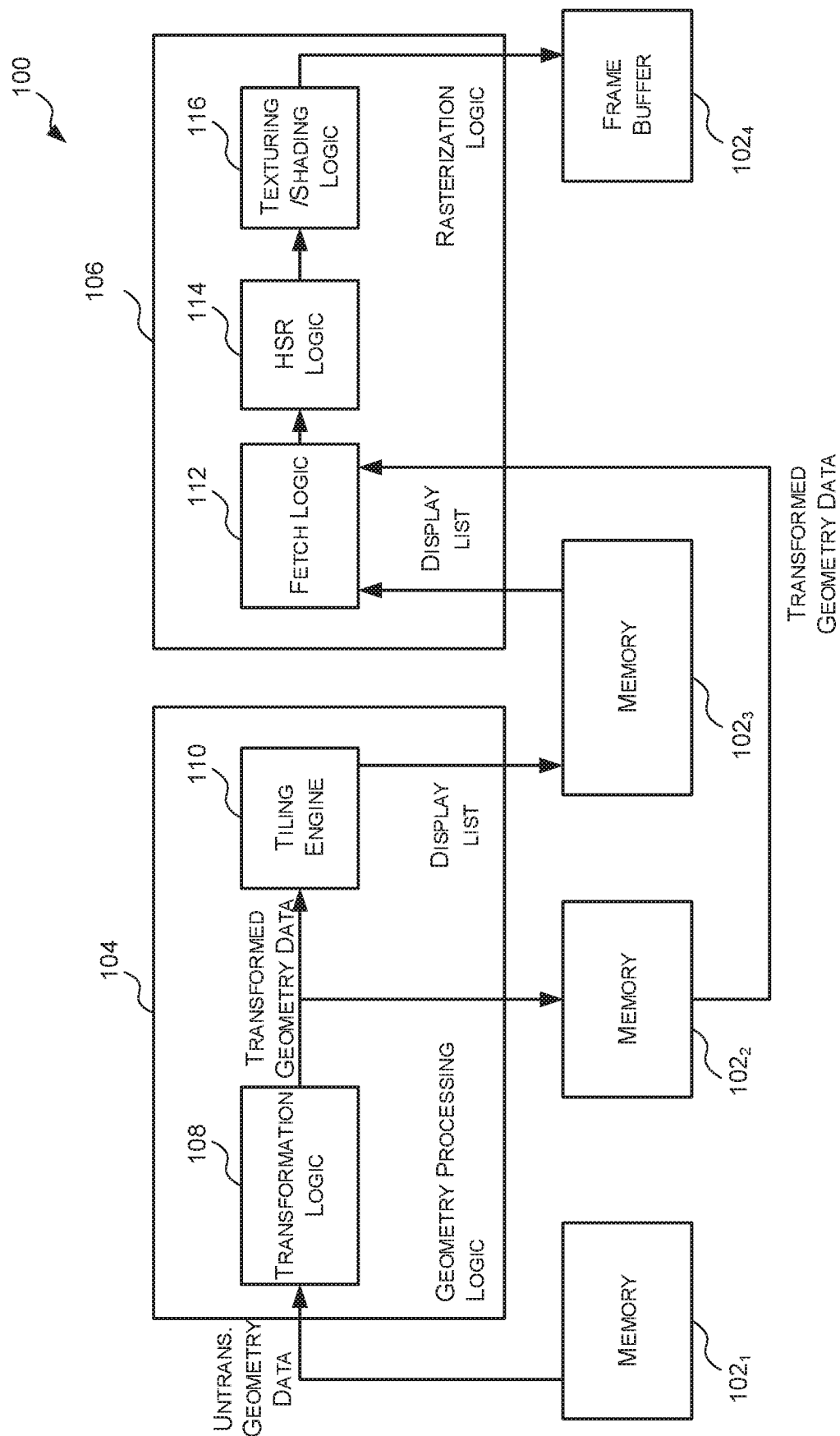
FIG. 1 is a block diagram of a known tile-based rendering graphics processing system.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art. Embodiments are described by way of example only.

Figure 2:
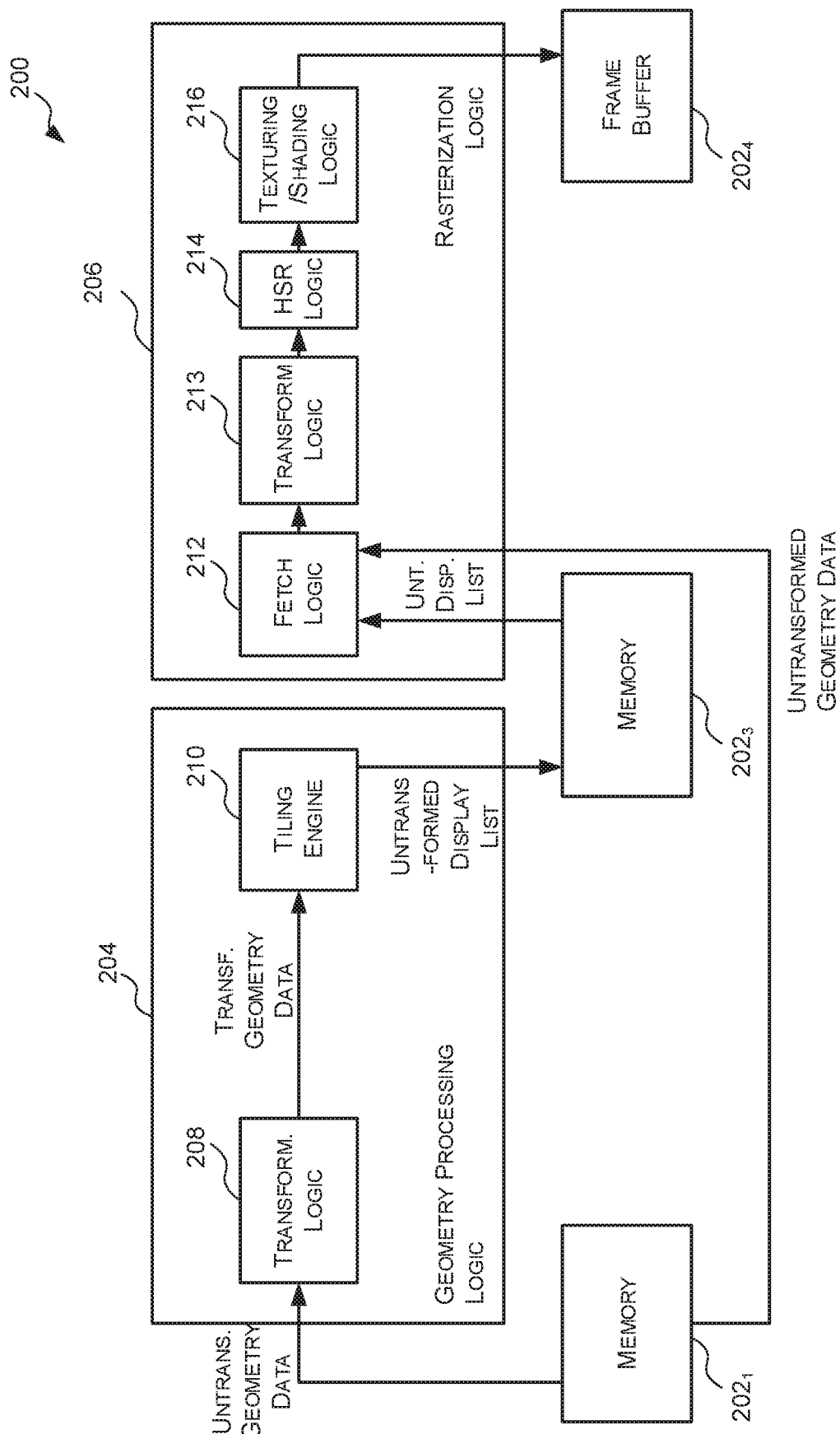
FIG. 2 is a block diagram of a known untransformed display list graphics processing system.

As described above, untransformed display list (UDL) graphics processing systems, such as the graphics processing system 200 shown in FIG. 2, do not store in memory the transformed geometry data generated in the geometry processing phase, but instead generate an untransformed display list for each tile which refers to untransformed primitives and then the untransformed geometry data corresponding to the untransformed primitives identified in each display list is transformed again in the rasterization phase. Such systems eliminate the need for transferring transformed geometry data generated in the geometry processing phase to a memory and storing the transformed geometry data in the memory. This can avoid the delay in transferring the transformed geometry data to and from an external memory. For example, a memory can be considered to be an "external memory" if it is not on the same chip as the geometry processing logic or the rasterization logic. For example, an external memory may be a system memory, wherein communication between the geometry processing logic or the rasterization logic and the system memory takes place over a system bus, e.g. via a memory interface. Therefore, transferring data to and/or from an external memory incurs a significant cost in terms of latency and power consumption, so avoiding transferring data to and/or from an external memory can be particularly beneficial to a graphics processing system which is attempting to process graphics data quickly (e.g. in real-time) without consuming a lot of power (e.g. if it is implemented on a battery-powered mobile device such as a smart phone or a tablet). These memory-based benefits can provide a significant improvement in the performance of a TBR graphics processing system, especially when used to render scenes for complex games. However, these benefits come at the expense of having to re-transform the untransformed geometry data in the rasterization phase.

Figure 3:
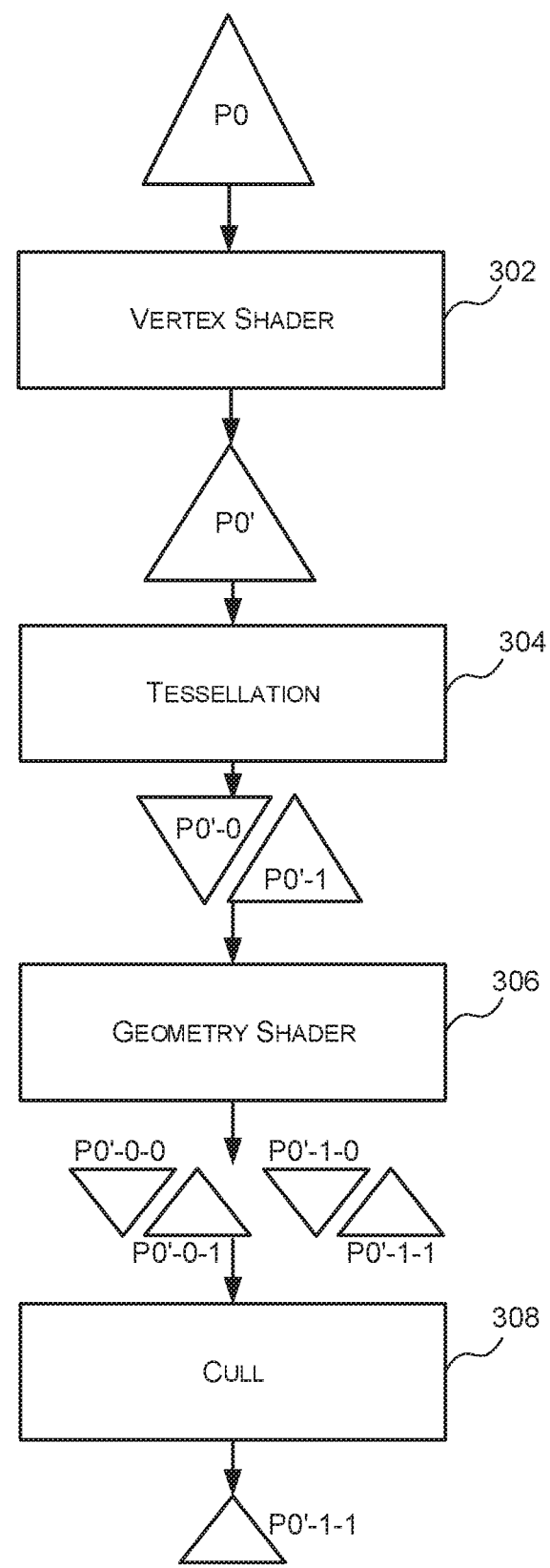
FIG. 3 is a schematic diagram illustrating example transformation stages and the primitives and sub-primitives that are generated thereby.

The process of transforming untransformed geometry for an untransformed primitive may comprise one or more transformation stages. For example, transforming untransformed geometry data may comprise one or more of: a vertex shader stage, a tessellation stage (which may include a hull shader sub-stage and/or a domain shader sub-stage); a geometry shader stage; a viewport transformation stage; and/or a clipping and/or culling stage. Each transformation stage receives geometry data for a primitive and outputs geometry data for one or more primitives. Some of these transformation stages (such as a vertex shader stage or a viewport transformation stage) receive geometry data for a primitive and alter the parameters (e.g. the colour, texture or position in space) of that primitive. In these transformation stages there is a one-to-one mapping between the primitives input to the stage and the primitives output from the stage. In contrast, other stages (such as a tessellation stage or a geometry shader stage) receive geometry data for a primitive and generate one or more new primitives (which may be referred to herein as sub-primitives) from that primitive. Therefore, in theses stages there may not be a one-to-one mapping between the primitives input to that stage and the primitives output from that stage (e.g. there may be a one-to-many mapping). As these transformation stages may increase the number of primitives they may be referred to as expansion transformation stages.

Where there are one or more expansion transformation stages not all of the sub-primitives generated thereby may be useful in generating the final image. For example, FIG. 3 shows an example implementation of untransformed geometry data processing which comprises a vertex shader stage 302, a tessellation stage 304, a geometry shader stage 306 and a culling stage 308. When an original untransformed primitive (P0) is processed by the vertex shader stage 302, the vertex shader stage 302 may produce a modified version of that primitive (P0'). When the modified version of the original primitive (P0') is then processed by the tessellation stage 304, the tessellation stage 304 may produce two sub-primitives (P0-'0 and P0'-1). When the tessellation sub-primitives (P0-'0 and P0'-1) are processed by the geometry shader stage 306, the geometry shader stage 306 may produce two sub-primitives for each tessellation sub-primitive (P0'-0-0, P0'-0-1, P0'-1-0, P0'-1-1). When the geometry shader sub-primitives (P0'-0-0, P0'-0-1, P0'-1-0, P0'-1-1) are subsequently processed by the culling stage 308, the culling stage 308 may cull all of those sub-primitives except one (P0'-1-1) because, for example, the other sub-primitives fall outside the viewing frustum. Accordingly, the other geometry shader sub-primitives (P0'-0-0, P0'-0-1, P0'-1-0) will not be used in rendering the scene.

As described above, in a UDL graphics processing system the untransformed geometry data is transformed in both the geometry processing phase and the rasterization phase. If it is known in the geometry processing phase that certain sub-primitives are not going to be used in rendering the scene then the re-transformation of the untransformed geometry data in the rasterization phase can be performed more efficiently based on this knowledge as it can be used to reduce the amount of processing which is performed during the re-transformation. For example, if it is known in the rasterization phase that certain sub-primitives are not going to be used in rendering the scene then those sub-primitives may be discarded at an earlier stage in the process so that time and resources are not wasted further processing those sub-primitives.

In the example above, if it is determined in the geometry processing phase that certain geometry shader sub-primitives (P0'-0-0, P0'-0-1, P0'-1-0) are not going to be used in rendering the scene then the rasterization phase can use this information to discard these sub-primitives after the geometry shader stage 306 and thus not send them to the subsequent stage(s) (e.g. the culling stage 308 in the example shown in FIG. 3). Furthermore, where there is a hierarchy of sub-primitives such that a higher level sub-primitive may generate one or more lower level sub-primitives, a higher level sub-primitive may be considered not to be used in rendering the scene if none of the lowest-level sub-primitives related thereto, or generated therefrom, are to be used in rendering the scene. For example, in the example shown in FIG. 3, the first tessellation sub-primitive (P0'-0) may be considered not to be used in rendering the scene as none of the lower level sub-primitives related thereto (P0'-0-0 and P0'-0-1) are used to render the scene. If this information is provided to the rasterization phase, then the higher level sub-primitive (P0'-0) can be discarded after the tessellation stage and not passed to the lower level stages so that further sub-primitives are not generated therefrom.

The inventors have identified that this information can be conveyed from the geometry processing phase to the rasterization phase very efficiently via a mask that indicates which of the sub-primitives generated in a particular expansion transformation stage are to be used for rendering the scene and which are not. Such a mask will be referred to herein as an expansion transformation stage mask.

Accordingly, described herein are methods and systems for generating a rendering output from geometry data via a geometry processing phase and a rasterization phase wherein in the geometry processing phase the geometry data is transformed via one or more expansion transformation stages and an expansion transformation stage mask is generated for one or more of the expansion transformation stages which indicates which sub-primitives generated thereby will be used in rendering the scene; and in the rasterization phase the geometry data is re-transformed in accordance with the expansion transformation stage mask(s).

Figure 4:
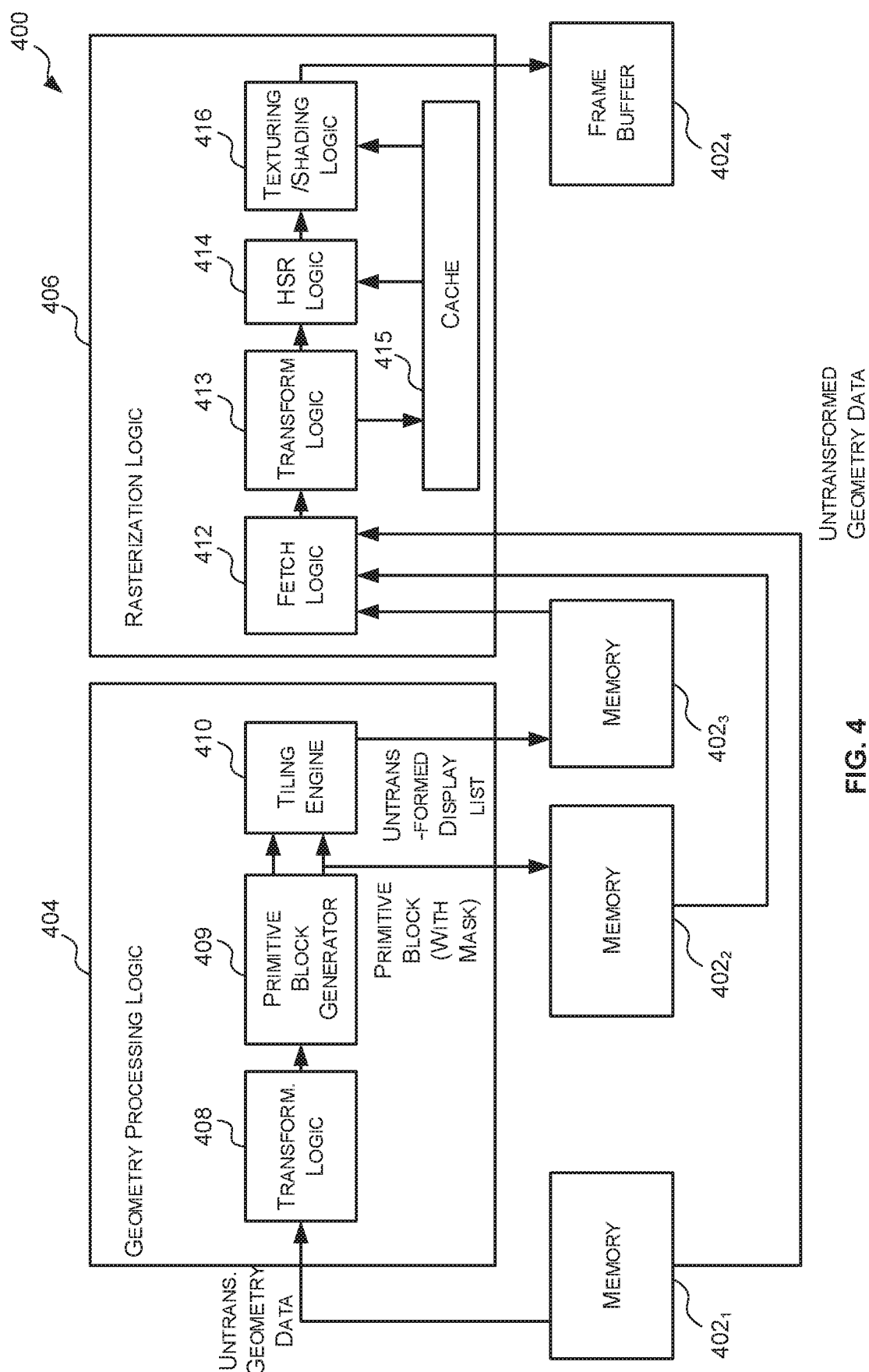
FIG. 4 is a block diagram of an example untransformed display list graphics processing system that uses expansion transformation stage masks for retransforming the untransformed primitives in the rasterization phase.

Reference is now made to FIG. 4 which shows an example untransformed display list (UDL) graphics processing system 400 wherein the geometry processing logic is configured to generate an expansion transformation stage mask for one or more of the expansion transformation stages thereof that indicates which of the sub-primitives generated by that expansion transformation stage are used in rendering the scene, and the rasterization logic is configured to re-transform the untransformed geometry data in accordance with the one or more expansion transformation stage masks. The system 400 shown in FIG. 4 is similar to the system 200 shown FIG. 2 in that it comprises memory $402_1$, $402_2$, $402_3$, $402_4$, geometry processing logic 404 and rasterization logic 406.

The memory $402_1$, $402_2$, $402_3$, $402_4$ may be implemented as one or more blocks of memory. The memory $402_1$, $402_2$, $402_3$, $402_4$ may be situated "off-chip" (i.e. not on the same chip as the geometry processing logic 404 and/or rasterization logic 406). The geometry processing logic 404 and the rasterization logic 406 may communicate with the memory $402_1$, $402_2$, $402_3$, $402_4$ via one or more communication buses as is known in the art.

As described above, an application generates geometry data describing primitives in a scene to be rendered which is stored in the memory $402_1$. The geometry data generated by the application is referred to herein as the untransformed geometry data and the primitives described thereby are referred to as the untransformed primitives. A primitive is a simple geometric shape, such as, but not limited to, a rectangle, triangle, line or point, to which a texture can be applied. Each primitive may be defined by one or more vertices. The untransformed geometry data comprises position data for each untransformed primitive that describes the position of that primitive in world space, but may also comprise other data for each untransformed primitive such as texture and colour data.

In some cases, the geometry data may be divided into vertex data and primitive data. The vertex data may comprise position data for each vertex (e.g. X, Y and Z coordinates in world space which describe the position of the vertex). The vertex data may also comprise a set of attributes to describe the appearance of the vertex, such as texture coordinates (U, V) and/or a base colour to apply to the vertex. The vertex data may be stored in a vertex buffer of the memory $402_1$. The primitive data may comprise information which indicates which vertices form each primitive. For example, where the primitives are triangles the primitive data may indicate which three vertices form that primitive. In some cases, the information in the primitive data that identifies a particular vertex may be an index or pointer to a particular portion of the vertex buffer that relates to that vertex. For example, if the vertices are numbered from 0 to 127 the portion of the vertex buffer that relates to vertex 0 may be identified by index or pointer 0 and the portion of the vertex buffer that relates to vertex 20 may be identified by index or pointer 20. The primitive data may be stored in an index buffer of the memory $402_1$. In these cases, the position data for an untransformed primitive may comprise the position data (e.g. X, Y, Z coordinates) for each vertex that forms that untransformed primitive.

The geometry processing logic 404, like the geometry processing logic 204 shown in FIG. 2, implements the geometry processing phase of TBR. Specifically, it generates transformed position data for each untransformed primitive and generates an untransformed display list for each tile that indicates which untransformed primitives, once transformed, will lie, at least partially within the bounds of that tile. However, unlike, the geometry processing logic 204 shown in FIG. 2, the geometry processing logic 404 shown in FIG. 4 also generates a mask for each untransformed primitive that indicates which sub-primitives thereof are to be used in rendering the scene. The geometry processing logic 404 shown in FIG. 4 comprises transformation logic 408, a primitive block generator 409, and a tiling engine 410.

The transformation logic 408 is configured to receive at least the position data for the untransformed primitives and generate at least transformed position data for each untransformed primitive. In some cases, the transformation logic 408 may also receive and transform other aspects of the untransformed geometry data for the untransformed primitives. The transformed position data for an untransformed primitive defines the position of one or more primitives in rendering space (e.g. screen space). The primitives in rendering space are referred to herein as transformed primitives. Therefore the transformation logic 408 transforms the untransformed primitives into transformed primitives. The transformation logic 408 shown in FIG. 4 is configured to generate the transformed position data for the untransformed primitives by processing the position data therefor in one or more transformation stages. Example transformation stages include, but are not limited to: a vertex shader stage; a tessellation stage (which may comprise a hull shader sub-stage and/or a domain shader sub-stage); a geometry shader stage; a viewport transformation stage; and a culling or clipping stage.

Each transformation stage receives position data for a primitive and outputs position data for one or more primitives. Some transformation stages (such as a vertex shader stage or a viewport transformation stage) receive position data for a primitive and alter the position data of that primitive. Therefore in these transformation stages there is a one-to-one mapping between the primitives input to the stage and the primitives output from that stage. In contrast, other transformation stages (such as a tessellation stage or a geometry shader stage) receive geometry data for a primitive and generate one or more new primitives (which may be referred to herein as sub-primitives) from that primitive. Therefore, in these transformation stages there may not be a one-to-one mapping between the primitives input to that stage and the primitives output from that stage (e.g. there may be a one-to-many mapping). As these transformation stages may increase the number of primitives they may be referred to as expansion transformation stages.

In the embodiments described herein, the one or more transformation stages implemented by the transformation logic 408 include at least one expansion transformation stage which is used to process the position data for at least a portion of the untransformed geometry data. When an untransformed primitive is processed by at least one expansion transformation stage the transformed position data related thereto comprises position data that describes the position of one or more sub-primitives in rendering space. In contrast, when an untransformed primitive is not processed by any expansion transformation stages the transformed position data related thereto comprises position data describing the position of that primitive in rendering space.

As described above, each sub-primitive generated by an expansion transformation stage may not be actually used in rendering the scene. For example, as described above with respect to FIG. 3, one or more sub-primitives may be culled by a culling stage before it is rasterized. Since the position data for the untransformed primitives is re-transformed in the same manner in the rasterization phase the re-transformation in the rasterization phase can be implemented more efficiently if the rasterization phase knows in advance which of the sub-primitives are going to be used in rendering the scene. For example, if the rasterization phase knows in advance which of the sub-primitives are not going to be used in rendering the scene the rasterization phase can ignore or discard those sub-primitives.

Accordingly, in contrast to the transformation logic 208 shown in FIG. 2, in addition to generating transformed position data for the untransformed primitives, the transformation logic 408 shown in FIG. 4 is also configured to generate, for one or more of the expansion transformation stages, an expansion transformation stage mask which indicates which sub-primitives related to one or more untransformed primitives are going to be used in rendering the scene. Example methods for generating the expansion transformation stage mask(s) are described below with respect to FIGS. 6 to 10.

The primitive block generator 409 divides the transformed primitives generated by the transformation logic 408 into groups and generates an untransformed primitive block for each group of transformed primitives. Each untransformed primitive block comprises (i) information that identifies, not the transformed primitives in the group, but the untransformed primitives from which the transformed primitives in the group were generated; and (ii) an expansion transformation stage mask for at least one of the expansion transformation stages that indicates which of the sub-primitives that will be generated by that expansion transformation stage during the re-transformation of the untransformed primitives identified therein will be used for rendering the scene. By identifying the untransformed primitives that generate the transformed primitives in the group, the untransformed primitive block identifies the untransformed geometry data which will generate the transformed primitives in each group.

The primitive block generator 409 may use any suitable criteria for grouping the transformed primitives. In some cases, the primitive block generator 409 may be configured to group the transformed primitives based on the order in which they arrive at the primitive block generator 409. In other cases, the primitive block generator 409 may group the transformed primitives based on their position in the rendering space. For example, the primitive block generator 409 may be configured to group the transformed primitives so that transformed primitives which have similar positions in the rendering space are in the same group.

In some cases, all of the transformed primitives that relate to the same untransformed primitive are placed in the same group so that each untransformed primitive will only be identified in a maximum of one untransformed primitive block. However, in other cases, transformed primitives that relate to the same untransformed primitive can be in different groups such that the same untransformed primitive can be identified in multiple untransformed primitive blocks. In these cases, each untransformed primitive block may also include information that identifies which of the transformed primitives related to the identified untransformed primitives form part of that untransformed primitive block. For example, if an untransformed primitive (UP0) is transformed into two transformed primitives (TP0, TP1) by the transformation logic 408 and the primitive block generator 408 places the first transformed primitive (TP0) in a first group and the second transformed primitive (TP1) in a second group then the untransformed primitive blocks for each of these groups would include information identifying the untransformed primitive (UP0). However, each of these untransformed primitive block would include information that indicates a different subset of the transformed primitives related thereto was associated with the untransformed primitive block.

Figure 5:
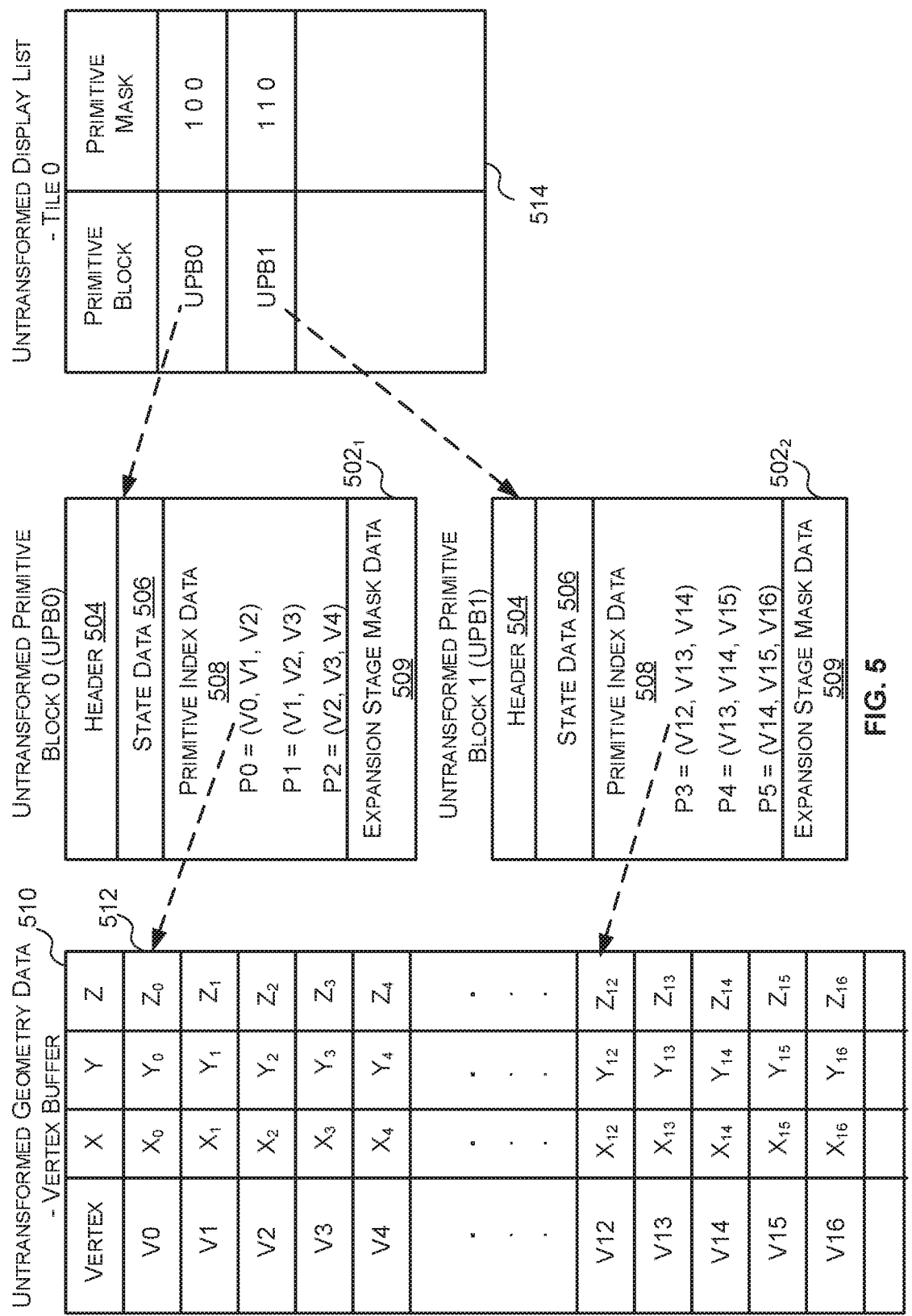
FIG. 5 is a schematic diagram illustrating an example untransformed display list, example untransformed primitive blocks and example untransformed geometry data.

Example untransformed primitive blocks $502_1$, $502_2$ are shown in FIG. 5. The example untransformed primitive blocks $502_1$, $502_2$ shown in FIG. 5 include a header 504, state data 506, primitive index data 508, and expansion transformation stage mask data 509. The header 504 includes information that describes the untransformed primitive block. For example, the header 504 may include, but is not limited to, the number of vertices referred to in the untransformed primitive block and/or the number of untransformed primitives referred to in the untransformed primitive block. The state data 506 includes information that describes how the transformed primitives generated from the untransformed primitives identified in the untransformed primitive block $502_1$ or $502_2$ are to be rendered by the rasterization logic 406. The state data can be described as identifying the recipe for rendering the transformed primitives generated from the untransformed primitives identified in the untransformed primitive block. For example, the state data may include, but is not limited to, information identifying a depth compare mode, a blending state, a texture state, and/or a primitive type. The primitive index data 508 comprises a set of indices for each untransformed primitive that identify the vertices that form that primitive. For example, where the primitives are triangles the primitive index data 508 may comprise a set of three indices which identify the three vertices that form the triangle. The indices are the indices of the vertices sent from the application. Each index acts as a pointer to the portion of the untransformed geometry data 510 stored in memory $402_1$ that defines, or relates to, a particular vertex.

For example, as shown in FIG. 5 the primitive index data 508 for the first untransformed primitive block $502_1$ identifies three untransformed primitives—P0, P1 and P2—via their vertices. Specifically, the first untransformed primitive P0 is identified as being formed by vertices V0, V1 and V2, the second untransformed primitive P1 is identified as being formed by vertices V1, V2 and V3, and the third untransformed primitive P2 is identified as being formed by vertices V2, V3, V4. Each vertex index or identifier acts as a pointer to the portion of the untransformed geometry data 510 (e.g. the portion of a vertex buffer) that defines, or is related to, a particular vertex. For example, the identification of vertex 0 (V0) acts as a pointer to the portion 512 of the untransformed geometry data 510 that defines, or relates to, vertex 0 (V0). As described above, the untransformed geometry data for a particular vertex may comprise position data (e.g. a set of coordinates in world space, such as X, Y and Z coordinates, that describe the position of the vertex). In some cases, the primitive index data may be generated by copying, or writing out, the portion of the index buffer that relates to the relevant primitives. The primitive index data 508 in an untransformed primitive block may be compressed according to any suitable compression technique.

The expansion transformation stage mask data 509 comprises an expansion transformation stage mask for one or more of the expansion transformation stages of the transformation logic that indicates which of the sub-primitives that will be generated for the untransformed primitives identified in the untransformed primitive block will be used in rendering the scene. The expansion transformation stage mask for a particular expansion transformation stage may be generated by combining the masks generated by the transformation logic 408 for the untransformed primitives in the untransformed primitive block. The expansion transformation stage mask(s) that may be included in an untransformed primitive block and how it/they may be generated is described in more detail below with respect to FIGS. 6 to 10.

Returning to FIG. 4, the untransformed primitive blocks that are generated by the primitive block generator 409 are stored in memory $402_2$. The transformed primitives generated by the transformation logic 408 are then provided to the tiling engine 410 along with information indicating which untransformed primitive blocks they belong to. The tiling engine 410 determines, which transformed primitives will be used to render each tile. A transformed primitive may be determined to be used to render a tile if the transformed primitive falls, at least partially, within the bounds of the tile. The tiling engine 410 then generates for each tile, an untransformed display list, which identifies the untransformed primitives that, when transformed, will generate at least one transformed primitive that will be used to render the tile.

In some cases, the untransformed display list for a tile may comprise information identifying the untransformed primitive blocks that contain the relevant untransformed primitives and a primitive mask for each identified untransformed primitive block that identifies which transformed primitives generated by the untransformed primitives identified in that untransformed primitive block will be used to render the tile. The information identifying a particular untransformed primitive block may be the address of the untransformed primitive block in memory or any other suitable identifier that uniquely identifies the untransformed primitive block. The primitive mask may comprise, for example, a bit for each transformed primitive that will be generated by the transformation logic when the untransformed primitives identified in the untransformed primitive block are re-transformed in the rasterization phase. A bit in the mask may be set to one value (e.g. a "1") when the corresponding transformed primitive is to be used to render the tile and set to another value (e.g. "0") when the corresponding transformed primitive is not to be used to render the tile. For example, if each untransformed primitive block can produce a maximum of 32 transformed primitives then each primitive mask may comprise 32 bits.

An example untransformed display list 514 for a tile is shown in FIG. 5. In this example, there are six untransformed primitives numbered 0 to 5 and untransformed primitives 0 to 2 (P0, P1, P2) are in untransformed primitive block 0 (UPB0) and untransformed primitives 3 to 5 (P3, P4, P5) are in untransformed primitive block 1 (UPB1). If the tiling engine 410 determines, from the transformed position data, that at least one transformed primitive generated from each of untransformed primitives 0, 3 and 4 falls within a particular tile (e.g. tile 0) then the tiling engine 410 may generate the untransformed display list 514 shown in FIG. 5 for that particular tile. Specifically, the tiling engine 410 may generate an untransformed display list 514 that comprises (i) information identifying untransformed primitive blocks 0 and 1 as containing index data for untransformed primitives that are to be used to render the tile 0; and (ii) a primitive mask (e.g. "100") for untransformed primitive block 0 that indicates that the first transformed primitive generated for that untransformed primitive block is to be used to render the tile; and (iii) a primitive mask (e.g. "110") for the untransformed primitive block 1 (PB1) that indicates that the second and third transformed primitives generated for that untransformed primitive block are to be used to render the tile. The description herein may describe an untransformed primitive as being "in" or "contained in" an untransformed primitive block (or words to that effect), and this is to be understood to include the case in which identifiers of the untransformed primitive (e.g. the primitive index data 508 shown in FIG. 5) are included in the untransformed primitive block even when the vertex data itself for the untransformed primitive is not included in the untransformed primitive block (e.g. the vertex data for the untransformed primitive is instead included in the untransformed geometry data vertex buffer in the example shown in FIG. 5).

Each untransformed display list generated by the tiling engine 410 is stored in memory $402_3$.

The rasterization logic 406 shown in FIG. 4, like the rasterization logic 206 shown in FIG. 2, implements the rasterization phase of TBR. Specifically, the rasterization logic 406 renders the primitives in a tile-by-tile manner by fetching the untransformed geometry data for the untransformed primitives identified in the untransformed display list for that tile, transforming the fetched untransformed geometry data to generate transformed primitives, and rendering the transformed primitives in accordance with the geometry data therefor. However, unlike the rasterization logic 206 shown in FIG. 2, the rasterization logic 406 shown in FIG. 4 receives an expansion transformation stage mask or a set of expansion transformation stage masks for one or more of the expansion transformation stages that indicates which sub-primitives are used in the rendering of the scene, and the rasterization logic 406 shown in FIG. 4 is configured to retransform the fetched untransformed geometry data in accordance with the mask or set of masks.

As shown in FIG. 4 the rasterization logic 406 may comprise fetch logic 412, transformation logic 413, an optional cache 415, hidden surface removal (HSR) logic 414, and texturing/shading logic 416. In this example the rasterization logic 406 is configured to fetch and transform untransformed geometry on an untransformed primitive block-basis. Specifically, the rasterization logic 406 is configured to fetch and transform the geometry data for all of the untransformed primitives in an untransformed primitive block referred to in an untransformed display list regardless of whether all of the untransformed primitives are to be used in rendering the tile.

Accordingly, to process a tile the fetch logic 412 fetches the untransformed display list for that tile from memory $402_3$. Then for each untransformed primitive block identified in the untransformed display list, the fetch logic 412 determines whether the cache 415 comprises transformed geometry data for that untransformed primitive block. If the cache 415 does not comprise transformed geometry data for that untransformed primitive block then the fetch logic 412 fetches the untransformed geometry data for that untransformed primitive block.

Fetching the untransformed geometry data for an untransformed primitive block may comprise: (i) fetching the untransformed primitive block from memory 402$_2$; (ii) identifying the untransformed geometry data related to the untransformed primitives identified in the untransformed primitive block (e.g. the untransformed primitives for which index data is stored in the untransformed primitive block); and (iii) fetching the untransformed geometry data from the memory 402$_1$. Any untransformed geometry data fetched from memory 402$_1$ is provided to the transformation logic 413 which re-transforms the untransformed geometry data (e.g. untransformed primitives) to generate transformed geometry data (e.g. transformed primitives). Transforming the untransformed geometry data comprises at least transforming the position data of the untransformed geometry data into rendering space (e.g. screen space). Transforming the untransformed geometry data may also comprise performing functions such as clipping and culling to remove primitives that fall outside of a viewing frustum and/or performing lighting/attribute processing on the primitives.

In the examples described herein, the transformation logic 413, in addition to receiving the untransformed geometry data for an untransformed primitive block, also receives one or more expansion transformation stage masks which describe which sub-primitives generated by a particular expansion transformation stage from the untransformed primitives identified in the untransformed primitive block are to be used in rendering the tile, and the transformation logic 413 is configured to re-transform the untransformed geometry data in accordance with the expansion transformation stage mask(s). In some cases, re-transforming a set of untransformed primitives identified in a primitive block in accordance with the one or more expansion transformation stage masks may comprise discarding any sub-primitives generated by an expansion transformation stage that are not identified in the expansion transformation stage mask for that expansion transformation stage as being used to render the scene. In some cases, each expansion transformation stage mask may comprise a bit for each sub-primitive that will be generated by the corresponding expansion transformation stage from the untransformed primitives in the untransformed primitive block, so the sub-primitives can be directly culled against the expansion transformation stage mask. Any transformed geometry data (e.g. transformed primitives) generated by the transformation logic 413 is stored in the cache 415. Some alternative examples might not implement the expansion transformation stage masks, in which case none of the sub-primitives are culled at this point in the processing.

Once transformed geometry data for an untransformed primitive block referred to in the untransformed display list for a tile is stored in the cache 415, the fetch logic 412 and/or the transformation logic 413 notify the HSR logic 414 that the HSR logic 414 can begin processing the tile using the transformed geometry data for that untransformed primitive block and which transformed primitives associated with the untransformed primitive block are relevant for rendering the tile. The HSR logic 414 rasterizes the transformed primitives for the tile, e.g. by performing scan conversion on the transformed primitives to generate primitive fragments and removing primitive fragments which are hidden (e.g. hidden by other primitive fragments). Methods of performing hidden surface removal are known in the art. The remaining fragments (after hidden surface removal) are then passed to the texturing/shading logic 416 which performs texturing and/or shading on the primitive fragments to determine pixel values of a rendered image which can be passed to the memory for storage in a frame buffer. Although not shown in FIG. 4, the texturing/shading logic 416 may receive texture data from the memory in order to apply texturing to the primitive fragments, as is known to those of skill in the art. The texturing/shading logic 416 may apply further processing to the primitive fragments (e.g. alpha blending and other processes), as is known to those of skill in the art in order to determine rendered pixel values of an image.

Expansion Transformation Stage Mask Generation

Figure 6:
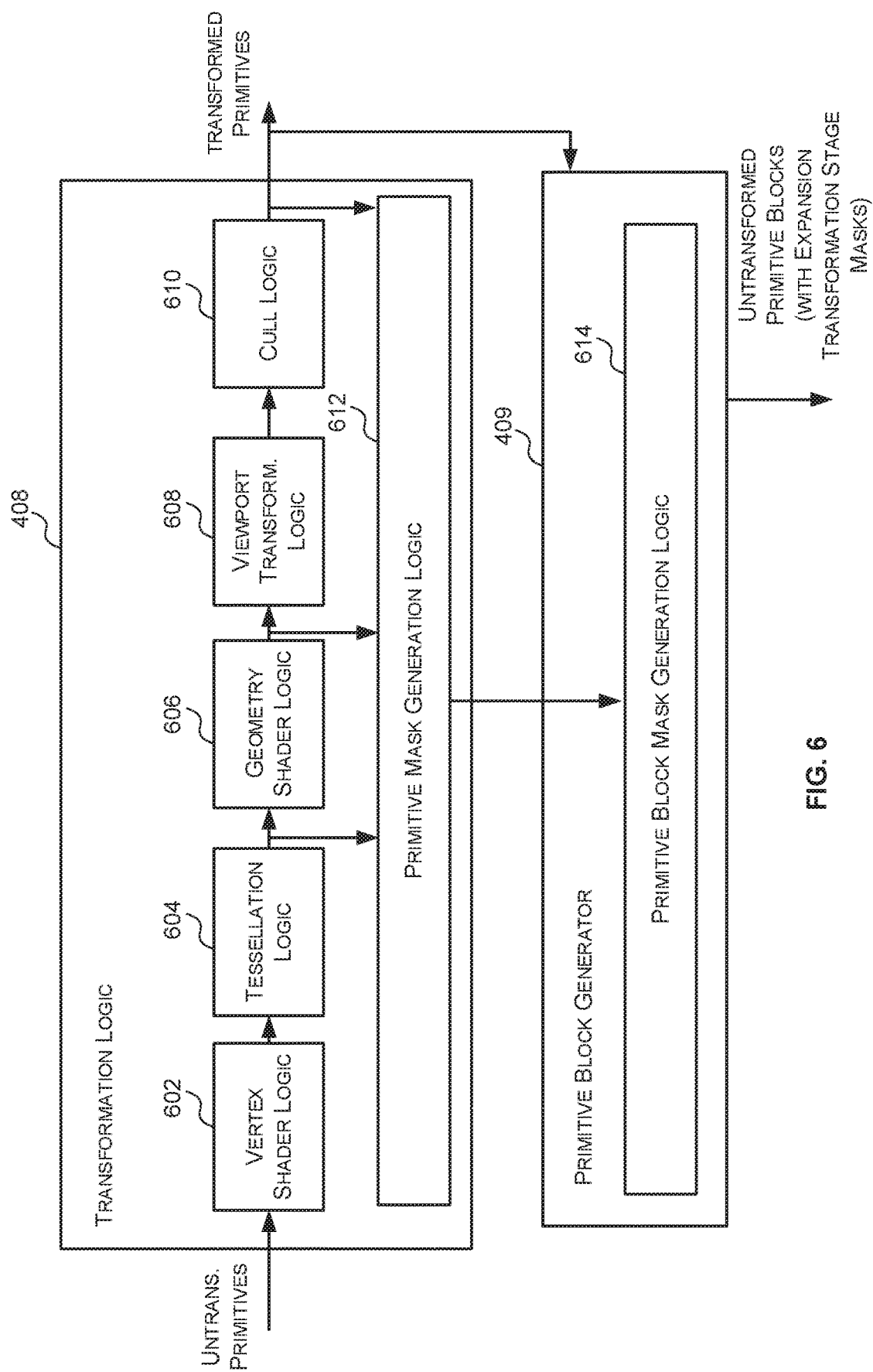
FIG. 6 is a block diagram of an example implementation of the transformation logic shown in FIG. 4.

Reference is now made to FIGS. 6 to 10 which are used to describe the process of generating the expansion transformation stage masks in more detail. FIG. 6 illustrates an example implementation of the transformation logic shown in FIG. 4. As described above, the transformation logic receives a set of untransformed primitives in world space and transforms the received untransformed primitives into a set of transformed primitives in the rendering space (e.g. screen space). The transformation may be performed in one or more stages such as, but not limited to, a vertex shader stage, a tessellation stage, a geometry shader stage, a viewport transformation stage, and/or a clipping and/or culling stage. In the example shown in FIG. 6, the transformation logic 408 comprises vertex shader logic 602, tessellation logic 604, geometry shader logic 606, viewport transformation logic 608 and clipping and/or culling logic 610 which each implement one transformation stage. Each transformation stage is configured to receive a set of primitives (i.e. geometry data defining a set of primitives) and output a modified set of primitives (i.e. modified geometry data defining a set of primitives).

As is known to those of skill in the art, a vertex shader stage is used to add special effects to objects in a three-dimensional (3D) scene by performing mathematical operations on the object's vertex data. Specifically, a vertex shader stage is configured to alter one or more vertex properties. Accordingly, a vertex shader stage receives the vertex data (e.g. colour, texture or position) for a primitive and alters that vertex data (e.g. colour, texture or position) to achieve a particular effect. Accordingly, for each primitive input to a vertex shader stage the vertex shader stage outputs a modified primitive. In the example shown in FIG. 6 the vertex shader stage is the first stage thus the vertex shader receives the original untransformed primitives (e.g. the untransformed geometry data for the untransformed primitives) and generates modified primitives based thereon (e.g. primitives with modified positions).

A tessellation stage is used to convert a patch (i.e. a group of vertices and thus a group of primitives) into a set of different primitives (which are referred to herein as sub-primitives). A tessellation stage may be implemented in three sub-stages: a hull-shader sub-stage that produces a geometry patch that corresponds to each input patch; a tessellation sub-stage that creates a sampling pattern of the geometry patch and generates a set of sub-primitives therefrom; and a domain shader sub-stage that calculates the vertex values (e.g. position, colour, and/or texture) of the sub-primitives. The number of sub-primitives generated for an input patch may be equal to or greater than the number of primitives in the input patch. Having the transformation logic implement a tessellation stage allows the graphics processing system to evaluate lower detail models and render them in higher detail. Accordingly, a tessellation stage may output more primitives (in the form of sub-primitives) than it receives as input.

A geometry shader stage is used to process primitives and generate none, one or more than one new primitives therefrom (which are referred to herein as sub-primitives). A geometry shader stage is typically configurable and can be used to generate new shapes on the fly. A geometry shader stage is often used to perform layered rendering. Accordingly, a geometry shader stage may output more primitives than it receives.

A viewport transformation stage is configured to receive primitives in world space and transform them into rendering space (e.g. screen space). Specifically a viewport transformation stage is configured to receive vertices in a world window (e.g. world space coordinates) and convert them to a viewport (e.g. rendering space coordinates, such as, screen space coordinates), which is referred to herein as a viewport transformation. The world window is the portion of the scene in application-specific coordinates (e.g. kilometres, metres or centimetres) that the application wants to render. In contrast, the viewport is an area of the rendering space (e.g. pixels or sampling positions) used to generate the image of the scene. The viewport may cover a whole image or a portion thereof. Accordingly, the viewport transformation stage translates the incoming world space coordinates in the world window to rendering space coordinates in the viewport. In many cases, the geometry processing stage uses a single viewport (typically with dimensions that cover the entire image) at a time and the coordinates of all vertices are transformed to this viewport. However, some applications may use multiple viewports to achieve one or more visual effects.

The clipping and/or culling stage is used to remove any redundant primitives so as to reduce the workload in the remaining logic blocks. There are many different methods that can be used to identify that a primitive is redundant and therefore can be removed. Redundant primitives may be identified using any suitable method or combination of methods. For example, in some cases, a primitive may be deemed to be redundant, if it: is facing away from the user; is completely off the screen; is fully outside the clipping planes; has a bounding box that does not cover any sample points; and/or does not cover any sample points.

As described above, a transformation stage (e.g. a tessellation stage or a geometry shader stage) that can increase the number of primitives is referred to as an expansion transformation stage.

It will be evident to a person of skill in the art that this is an example implementation of the stages of the transformation logic and that the principles and techniques described herein may be equally applied to any graphics process system wherein the transformation logic comprises a different combination of transformation stages, e.g. comprising at least one expansion transformation stage.

The transformation logic 408 also comprises primitive mask generation logic 612 which is configured to generate a primitive expansion transformation stage mask for at least one of the expansion transformation stages for each untransformed primitive that indicates which sub-primitives generated by that expansion transformation stage for that untransformed primitive are to be used for rendering the scene. For example, as described above with respect to FIG. 3, a sub-primitive that is generated by a particular expansion transformation stage (e.g. a tessellation stage) may be discarded by another of the transformation stages (e.g. clipping and/or culling stage). Such sub-primitive is thus not going to be used to render the scene.

In some cases, the primitive expansion transformation stage mask for an untransformed primitive for a particular expansion transformation stage comprises a bit for each sub-primitive generated by that expansion transformation stage for that untransformed primitive. Each bit of the expansion transformation stage mask indicates whether or not the corresponding sub-primitive is to be used in rendering the scene. For example, if a tessellation stage generates four sub-primitives for an original untransformed primitive then the expansion transformation stage mask for the tessellation stage for that untransformed primitive may comprise four bits. Each bit may be set to one value (e.g. "1") when the sub-primitive is to be used in rendering the scene and may be set to a different value (e.g. "0") when the sub-primitive is not to be used in rendering the scene. If a "1" is used to indicate that a sub-primitive is used in rendering the scene and a "0" is used to indicate that a sub-primitive is not used in rendering the scene then if only the first three sub-primitives of the four sub-primitives in the example are used to render the scene the expansion transformation stage mask may be "1 1 1 0". Where an expansion transformation stage does not generate any sub-primitives for an untransformed primitive (e.g. because the expansion transformation stage is by-passed for that untransformed primitive) then the expansion transformation stage mask for that sub-primitive may be empty.

The primitive mask generation logic 612 may be configured to generate the expansion transformation stage masks by monitoring the output of the expansion transformation stage(s) (e.g. the output of the tessellation logic and/or the geometry shader logic) and comparing it to the output of the transformation logic (e.g. the transformed primitives that are output to the primitive block generator). For example, the primitive mask generation logic 612 may be configured to determine that a sub-primitive generated by a particular expansion transformation stage is not going to be used in rendering the scene if the transformation logic does not output any transformed primitives that correspond to, or are derived from, that sub-primitive. In some cases, the transformation logic may implement a single expansion transformation stage. In these cases, the primitive mask generation logic 612 may be configured to determine that a sub-primitive generated by that expansion transformation stage will not be used in rendering in the scene if the transformation logic does not output a transformed primitive for that sub-primitive.

Figure 7:
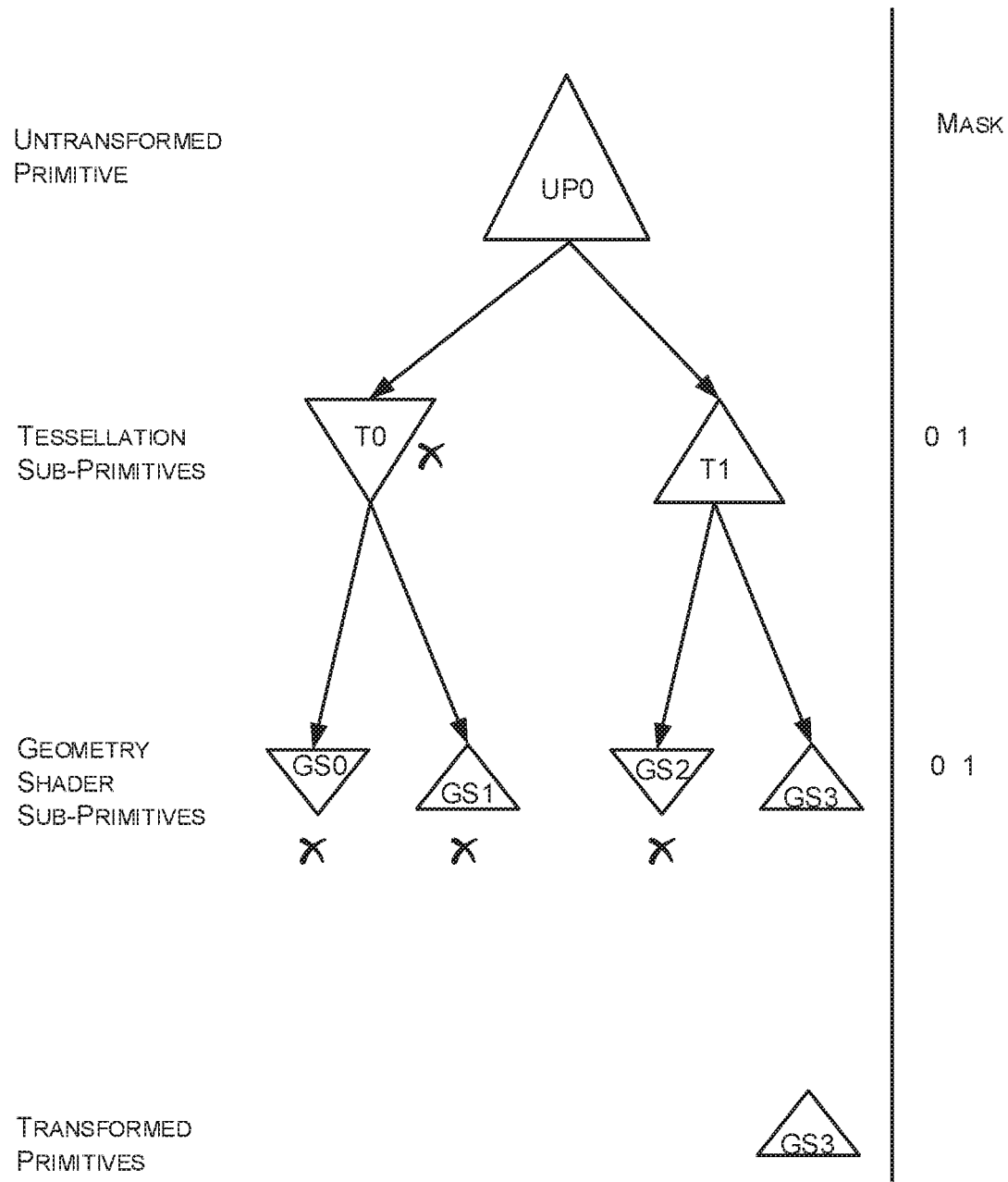
FIG. 7 is a schematic diagram illustrating example expansion transformation stage masks for an example untransformed primitive.

In other cases, the transformation logic may implement multiple transformation stages. In these cases, the transformation logic may be configured to generate a separate expansion transformation stage mask for all or any combination of the transformation stages. In some cases, such as that shown in FIG. 6, the transformation logic 408 may implement hierarchical expansion transformation stages such that the sub-primitives generated by a higher-level expansion transformation stage (e.g. tessellation stage) when processed by a lower-level (i.e. subsequent) expansion transformation stage (e.g. geometry shader stage) may themselves generate further sub-primitives. For example, as shown in FIG. 7, where the transformation logic 408 implements a tessellation stage which is subsequently followed by a geometry shader stage, when an untransformed primitive (UP0) is processed by the tessellation stage two sub-primitives (T0, T1) may be generated therefrom. When the tessellation sub-primitives (T0, T1) are then processed by the geometry shader stage two further sub-primitives (GS0, GS1 and GS2, GS3) may be generated for each input sub-primitive.

In these cases, the primitive mask generation logic 612 may be first configured to generate the expansion transformation stage mask for an untransformed primitive for the highest-level expansion transformation stage by determining, for each sub-primitive generated by the highest-level expansion transformation stage for that untransformed primitive, whether there are any transformed primitives output by the transformation logic 408 that correspond to that sub-primitive. If there are no transformed primitives output by the transformation logic that correspond to that sub-primitive, then that sub-primitive will not be used to render the scene and is identified as such in the expansion transformation stage mask (e.g. the bit corresponding thereto is set to '0'). If, however, there is at least one transformed primitive output by the transformation logic 408 that corresponds to that sub-primitive then that sub-primitive will be used to render the scene and is identified as such in the expansion transformation stage mask (e.g. the bit corresponding thereto is set to '1').

For example, in the example shown in FIG. 7 the highest-level expansion transformation stage is the tessellation stage. The tessellation stage generates two sub-primitives (T0, T1) for an untransformed primitive (UP0). The only transformed primitive output by the transformation logic 408 that relates to the original untransformed primitive (UP0) corresponds to the fourth geometry shader sub-primitive (GS3). Accordingly, there are no transformed primitives that relate to the first tessellation sub-primitive (T0) so it is determined that the first tessellation sub-primitive (T0) will not be used in rendering the scene and information is added to the expansion transformation stage mask to indicate this (e.g. a '0' is added to the expansion transformation stage mask). There is one transformed primitive (GS3) that relates to the second tessellation sub-primitive (T1) so it is determined that the second tessellation sub-primitive (T1) will be used in rendering the scene and information is added to the expansion transformation stage mask to indicate this (e.g. a '1' is added to this expansion transformation stage mask). The final expansion transformation stage mask for the untransformed primitive (UP0) for the tessellation stage may then be "0 1".

The primitive mask generation logic 612 may then be configured to generate an expansion transformation stage mask for that untransformed primitive for the next lowest expansion transformation stage. The expansion transformation stage mask for the untransformed primitive for the next lowest expansion transformation stage may be generated by determining, for any sub-primitive whose parent sub-primitive is to be used in rendering the scene, whether or not there are any transformed primitives output by the transformation logic 408 that correspond to that sub-primitive. No information may be added to the expansion transformation stage mask for sub-primitives whose parent sub-primitive is not to be used in rendering the scene.

For example, in the example shown in FIG. 7 the parent sub-primitive (T0) for the first two geometry shader sub-primitives (GS0 and GS1) will not be used in rendering the scene so no information is added to the expansion transformation stage mask for these sub-primitives (GS0, GS1). In contrast, the parent sub-primitive (T1) for the last two geometry shader sub-primitives (GS2, GS3) will be used in rendering the scene so information is added to the expansion transformation stage mask for these sub-primitives (GS2, GS3). Specifically, since there are no transformed primitives that correspond to the third geometry shader sub-primitive (GS2) information is added to the expansion transformation stage mask to indicate that the third geometry shader sub-primitive will not be used in rendering the scene (e.g. a "0" is added to the mask); and since there is a transformed primitive that corresponds to the fourth geometry shader sub-primitive (GS3) information is added to the expansion transformation stage mask to indicate that the third geometry shader sub-primitive will be used in rendering the scene (e.g. a "1" is added to the mask). This results in a final expansion transformation stage mask for the untransformed primitive (UP0) for the geometry shader stage of "0 1". No information is added for untransformed primitives whose parent sub-primitive was identified in an expansion transformation stage mask as not being used to render the scene on the basis that the transformation logic in the rasterization phase will not generate these sub-primitives. This process may be repeated for each subsequent expansion transformation stage in the hierarchy until an expansion transformation stage mask has been generated for each expansion transformation stage.

The primitive expansion transformation stage masks generated by the primitive mask generation logic 612 along with the transformed primitives generated by the transformation logic 408 are provided to the primitive block generator 409. As described above, the primitive block generator 409 is configured to group the transformed primitives based on one or more criteria (e.g. spatial position) and generate an untransformed primitive block for each group of transformed primitives that comprises (i) information that identifies the untransformed primitives that correspond to the transformed primitives in the group; and (ii) a block expansion transformation stage mask for one or more of the expansion transformation stages that indicates which sub-primitives, that will be generated by that expansion transformation stage for the untransformed primitives identified in the untransformed primitive block, will be used to render the scene.

Accordingly, as shown in FIG. 6, the primitive block generator 409 may comprise primitive block mask generation logic 614 that is configured to generate the block expansion transformation stage mask(s) for the expansion transformation stage(s) from the primitive expansion transformation stage masks generated by the primitive mask generation logic 612. In some cases, the primitive block mask generation logic 614 may be configured to generate the block expansion transformation stage mask for a particular expansion transformation stage by combining the primitive expansion transformation stage masks for the untransformed primitives identified in the untransformed primitive block for the expansion transformation stage. For example, the primitive block mask generation logic 614 may be configured to generate a block expansion transformation stage mask for a particular expansion transformation stage by concatenating the primitive expansion transformation stage masks for the particular expansion transformation stage for the untransformed primitives identified in the untransformed primitive block. The primitive expansion transformation stage masks for the untransformed primitives identified in the untransformed primitive block may be concatenated in the same order that they are in the untransformed primitive block. Where the transformation logic implements a plurality of expansion transformation stages the primitive block mask generation logic 614 may be configured to generate a block expansion transformation stage mask for each expansion transformation stage or only a portion of the expansion transformation stages.

Figure 8:
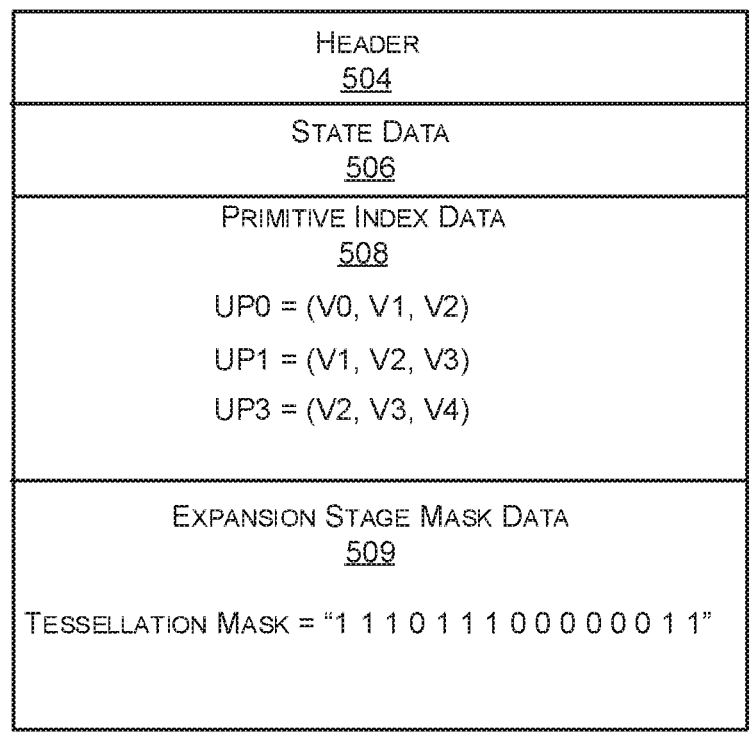
FIG. 8 is a schematic diagram illustrating an example untransformed primitive block with a tessellation stage mask.

For example, FIG. 8, shows example primitive tessellation stage masks for a set of untransformed primitives (UP0, UP1, UP2, UP3). For example, the first untransformed primitive (UP0) has a primitive tessellation stage mask of "1 1 1 0", the second untransformed primitive (UP1) has a primitive tessellation stage mask of "1 1 1 0 0 0", the third untransformed primitive (UP2) has a primitive tessellation stage mask of "0 0 1", and the fourth untransformed primitive (UP3) has a primitive tessellation stage mask of "0 0 0 1 1". If the primitive block generator 409 groups the transformed primitives related to these untransformed primitives such that an untransformed primitive block identifies the first, second and fourth untransformed primitives (UP0, UP1 and UP3) the primitive block mask generation logic may be configured to generate the block tessellation stage mask by concatenating the primitive tessellation stage masks for the first, second and fourth untransformed primitives. This results in a block tessellation stage mask of "1 1 1 0 1 1 1 0 0 0 0 0 0 1 1". Although not shown in FIG. 8, the expansion transformation stage mask data 509 may also comprise an expansion transformation stage mask for one or more other expansion transformation stages which may be generated in a similar manner.

While the concatenated block expansion transformation stage masks only comprise a bit per sub-primitive, some untransformed primitives may generate a large number of sub-primitives thus the expansion transformation stage masks can, in some cases, become large. To ensure that the untransformed primitive blocks don't become too large, in some cases, there may be a maximum size for all the block expansion transformation stage masks or a maximum size for each block expansion transformation stage mask. As described in more detail below, the maximum size for the block expansion transformation stage masks or the maximum size for each block expansion transformation stage mask may be dynamically determined. Where the primitive block mask generation logic 614 determines that the block expansion transformation stage mask/masks generated by concatenating the primitive expansion transformation stage masks for the untransformed primitives in the untransformed primitive block exceeds the maximum size, the primitive block mask generation logic 614 may be configured to compress the block expansion transformation stage mask(s) before storing the expansion transformation stage mask(s).

For example, in some cases the primitive block mask generation logic 614 may be configured to compress the/each concatenated block expansion transformation stage mask by OR-ing adjacent bits together. If the compressed block expansion transformation stage mask(s) still exceed the maximum size the process may be repeated until the compressed block expansion transformation stage mask(s) no longer exceed the maximum size. Where the concatenated block expansion transformation stage mask is compressed in this manner information may be added to the header of the untransformed primitive block that indicates the number of times the block expansion transformation stage mask(s) has/have been compressed. In some cases, the information indicating the number of times an untransformed primitive block mask has been compressed may be in the form of a counter that is incremented each time the untransformed primitive block mask is compressed.

Figure 9:
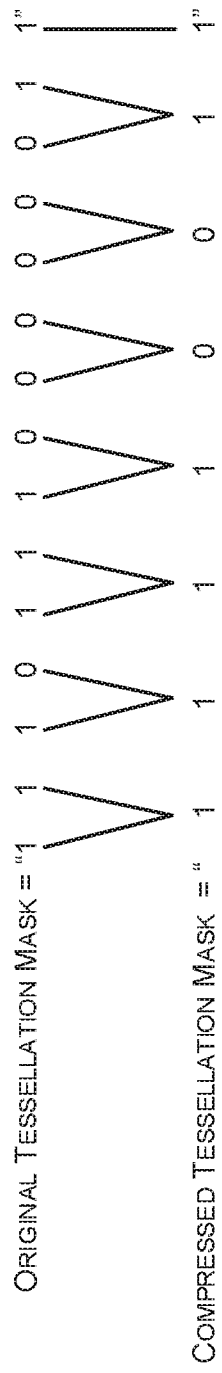
FIG. 9 is a schematic diagram illustrating an example method for compressing an expansion transformation stage mask for an untransformed primitive block.

FIG. 9 illustrates how the block tessellation stage mask of "1 1 1 0 1 1 1 0 0 0 0 0 1 1" shown in FIG. 8 may be compressed. Specifically, by OR-ing each adjacent pair of bits the compressed block tessellation stage mask becomes "1 1 1 1 0 0 1 1". It is noted that while this method is very efficient at compressing an expansion transformation stage mask since a single bit is used to describe multiple sub-primitives, it may result in the re-transformation being performed less efficiently in the rasterization phase than if the expansion transformation stage mask were uncompressed. This is because if any of the sub-primitives which a bit in a compressed expansion transformation stage mask represents will be used in rendering the scene then the bit will be set to '1' which means that all of the sub-primitives that a bit represents will be fully re-transformed instead of potentially discarding those which will not be used in rendering the scene.

For example, if the bit pair "1 0" in a concatenated block expansion transformation stage mask indicates a first sub-primitive will be used in rendering the scene and a second sub-primitive will not be used in rendering the scene then the rasterization logic may completely transform the first sub-primitive and discard the second sub-primitive. If, however this bit pair in the concatenated expansion transformation stage mask is compressed to a "1" then the rasterization logic will completely transform the first and second sub-primitives even though the second sub-primitive will not be used in rendering the scene.

This compression reduces the amount of data used to store the expansion transformation stage masks, and does not cause any rendering errors, but some of the processing efficiency gains provided by using the expansion transformation stage masks may be lost due to the compression. The compression process of OR-ing adjacent pairs of bits can be performed one or more times to achieve different levels of compression. When choosing a suitable level of compression, there is a trade-off to be considered between the reduction in the size of the compressed data achieved by a greater level of compression versus the reduction in the processing efficiency gains provided by using the expansion transformation stage masks which may result from using a greater level of compression.

As described above, the rasterization logic 406 is configured to render the scene on a tile basis. Specifically, the rasterization logic 406 is configured to, for each tile, fetch the untransformed display list for that tile, and then fetch and transform the untransformed primitives identified in the untransformed display list. The rasterization logic 406 is configured to fetch and re-transform the untransformed primitives (e.g. the untransformed geometry data related thereto) on a primitive block-basis. Specifically, when an untransformed display list refers to an untransformed primitive block the rasterization logic 406 is configured to fetch and transform all the untransformed primitives that are identified or referenced in that untransformed primitive block. Where an untransformed primitive block comprises an expansion transformation stage mask for one or more of the expansion transformation stages then the rasterization logic 406 is configured to re-transform the untransformed primitives identified or referenced therein in accordance with the expansion transformation stage masks. In some cases, re-transforming a set of untransformed primitives identified or referenced in an untransformed primitive block in accordance with the one or more expansion transformation stage masks may comprise discarding any sub-primitives generated by an expansion transformation stage that are not identified in the corresponding expansion transformation stage mask as being used to render the scene. In some cases, each expansion transformation stage mask may comprise a bit for each sub-primitive that will be generated from the untransformed primitives identified in the untransformed primitive block, so the sub-primitives can be directly culled by referencing them against the expansion transformation stage mask.

Where the header of the untransformed primitive block indicates that the expansion transformation stage mask(s) in the untransformed primitive block has/have been compressed then the rasterization logic 406 may be configured to expand or decompress the expansion transformation stage mask(s) prior to performing the re-transformation in accordance with the mask. Where the header indicates the number of times n that the expansion transformation stage mask(s) has/have been compressed then the expansion transformation stage mask(s) may be expanded or decompressed by replacing each '1' with n '1's and replacing each '0' with n '0's such that the expanded expansion transformation stage mask will have one bit for each sub-primitive generated by the corresponding expansion transformation stage for the untransformed primitives in the untransformed primitive block.

Although the primitive mask generation logic 612 and the primitive block mask generation logic 614 are shown in FIG. 6 as separate and distinct logic blocks, in other examples the functions described as being performed by the primitive mask generation logic 612 and the primitive block mask generation logic 614 may be performed by a single logic block or the functions described as being performed by the primitive mask generation logic 612 and the primitive block mask generation logic 614 may be distributed amongst a plurality of different logic blocks in a different manner.

Figure 10:
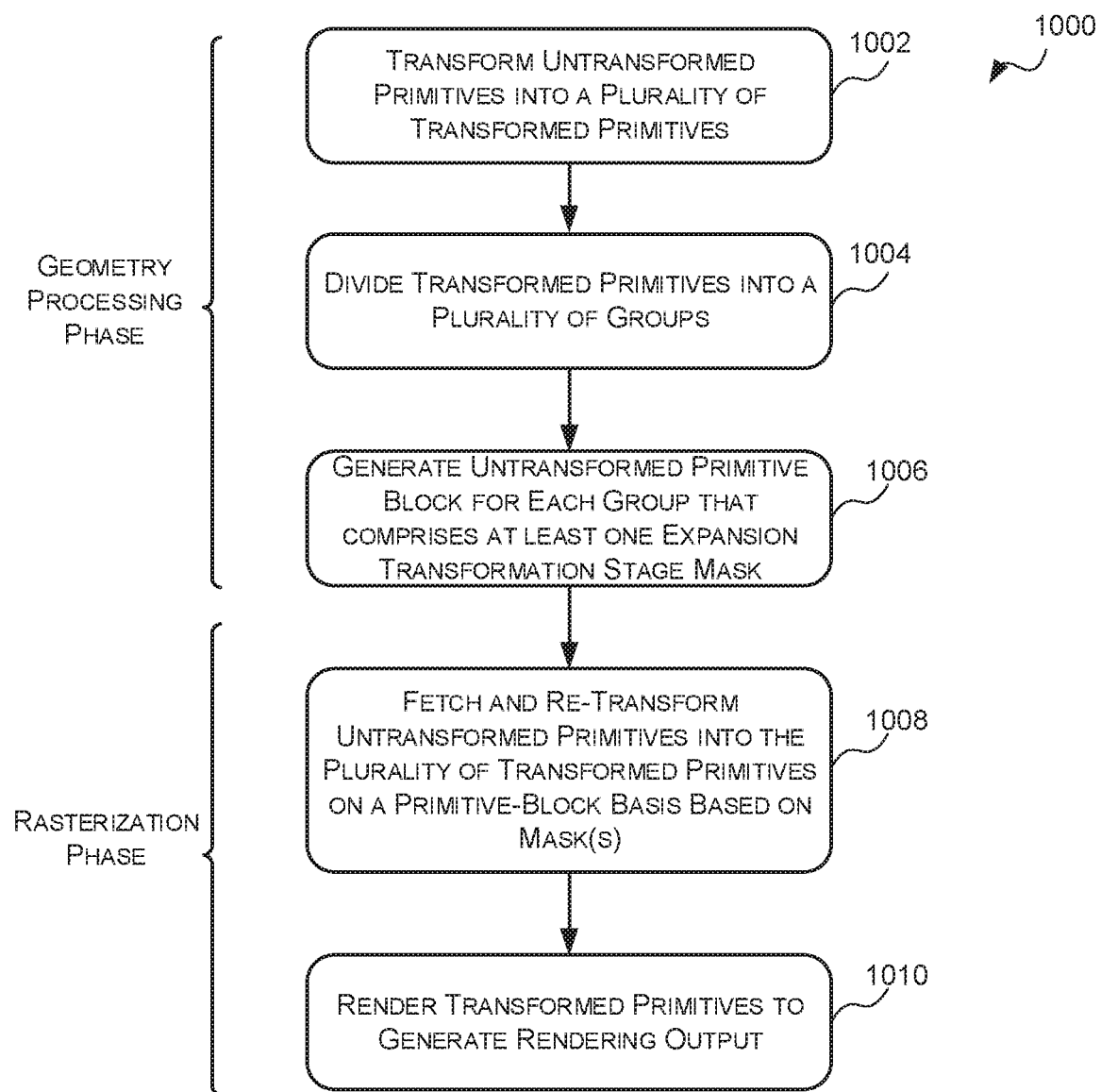
FIG. 10 is a flow diagram of an example method for generating a rendering output using the graphics processing system shown in FIG. 4 using expansion transformation stage masks.

Reference is now made to FIG. 10 which illustrates an example method for generating a rendering output in a UDL graphics processing system, such as the UDL graphics processing system 400 shown in FIG. 4, in a geometry processing phase and a rasterization phase. An expansion transformation stage mask is generated in the geometry processing phase for at least one expansion transformation stage that indicates which of the sub-primitives generated by that expansion transformation stage for a set of untransformed primitives will be used in rendering the scene and which will not be used in rendering the scene. The rasterization phase is configured to re-transform the untransformed primitives in accordance with the expansion transformation stage mask(s).

The method 1000 begins in the geometry processing phase at block 1002 where a plurality of untransformed primitives (e.g. the untransformed geometry data related thereto) in world space are transformed into a plurality of transformed primitives in rendering space. As described above, the transformation may be implemented via one or more transformation stages. For example, transforming untransformed primitives may comprise implementing one or more of: a vertex shader stage, a tessellation stage (which may include a hull shader sub-stage and/or a domain shader sub-stage); a geometry shader stage; a viewport transformation stage; and/or a clipping and/or culling stage. Each transformation stage receives geometry data for a primitive and outputs geometry data for one or more primitives. In these examples the one or more transformation stages includes at least one expansion transformation stage.

At block 1004, the transformed primitives generated in block 1002 are divided into groups (e.g. by a primitive block generator). As described above, the transformed primitives may be divided into groups using any suitable criteria. For example, in some cases the transformed primitives may be grouped based on the order in which they are received at the primitive block generator. In other examples, the transformed primitives may be grouped so that transformed primitives that have spatially similar positions are placed in the same group.

At block 1006, an untransformed primitive block is generated (e.g. by the primitive block generator) for each group of transformed primitives that comprises (i) information that identifies the untransformed primitives to which the transformed primitives in the group relate; and (ii) a block expansion transformation stage mask for one or more of the expansion transformation stages that indicates which sub-primitives generated for the untransformed primitives identified in the untransformed primitive block will be used in rendering the scene. As described above, the block expansion transformation stage mask for an expansion transformation stage may be generated by (i) generating a primitive expansion transformation stage mask for each untransformed primitive that indicates which sub-primitives generated by that expansion transformation stage for the untransformed primitive will be used in rendering the scene; and (ii) combining (e.g. concatenating) the primitive expansion transformation stage masks for the untransformed primitives that are identified in the untransformed primitive block.

The primitive expansion transformation stage mask for an untransformed primitive may be generated by comparing the sub-primitives output by that expansion transformation stage that correspond to that untransformed primitive to the transformed primitives and determining for each sub-primitive whether there is at least one transformed primitive that corresponds or relates to that sub-primitive. If there is at least one transformed primitive that corresponds or relates to a sub-primitive, then that sub-primitive will be used in rendering the scene. In contrast, where there are no transformed primitives that correspond or relate to a sub-primitive then the sub-primitive will not be used in rendering the scene. The primitive expansion transformation stage mask for an untransformed primitive may comprise a bit for each sub-primitive that indicates whether that sub-primitive will be used in rendering the scene.

Where the block expansion transformation stage mask exceeds a maximum size threshold the block expansion transformation stage mask may be compressed before it is added to the untransformed primitive block. As described above, where the block expansion transformation stage mask comprises a series of bits, the block expansion transformation stage mask may be compressed by, for example, OR-ing pairs of adjacent bits.

At block 1008, the rasterization phase begins, and the untransformed primitives are re-transformed on an untransformed primitive block basis to generate the transformed primitives in accordance with the expansion transformation stage mask(s) in the untransformed primitive blocks. Specifically, the rasterization phase fetches and re-transforms the untransformed primitives a whole untransformed primitive block at a time. For example, as described above, the rasterization logic may be configured to, for each tile, fetch the untransformed display list for that tile, fetch all the untransformed primitives (e.g. the untransformed geometry data related thereto) for each untransformed primitive block referred to therein; and transform the fetched untransformed primitives in accordance with the expansion transformation mask(s) in that untransformed primitive block. In some cases, transforming the untransformed primitives identified in an untransformed primitive block in accordance with the expansion transformation stage mask(s) in that untransformed primitive block comprises culling or discarding the sub-primitives generated by an expansion transformation stage for the untransformed primitives when the expansion transformation stage mask for that expansion transformation stage indicates that the sub-primitive will not be used in rendering the scene. As described above, if the expansion transformation stage mask(s) is/are compressed the rasterization logic may be configured to decompress or expand the expansion transformation stage mask(s) prior to using them to re-transform the untransformed primitives.

At block 1010, the transformed primitives generated in block 1008 are rendered to create the rendering output. Rendering the transformed primitives may comprise rasterizing the transformed primitives to generate primitive fragments and performing hidden surface removal; and/or texturing and/or shading on the primitive fragments to generate colour values for each pixel.

It will be evident to a person of skill in the art that the above describes one example of how the expansion transformation stage mask(s) in the untransformed primitive blocks are generated and that the expansion transformation stage mask(s) in the untransformed primitive blocks may be generated in any suitable manner. For example, in another example the primitive block generator may receive for each transformed primitive sideband information that indicates which tessellation index or geometry shader index it relates to; along with a flag that indicates whether that transformed primitive was culled or not. The primitive block generator can then generate the expansion transformation stage mask(s) on the fly. In yet another example the expansion transformation stage itself may keep track of the number of sub-primitives generated for each of the input primitives and this information may be provided to the primitive block generator.

In the examples described above, a '0' in an expansion transformation stage mask indicates that a sub-primitive will not be used in rendering the scene, a '1' in an expansion transformation stage mask indicates that a sub-primitive will be used in rendering the scene, and the mask can be compressed using an OR operation to combine adjacent pairs of bits in the mask. It will be appreciated that in alternative examples, which achieve the same effect, a '1' in an expansion transformation stage mask indicates that a sub-primitive will not be used in rendering the scene, a '0' in an expansion transformation stage mask indicates that a sub-primitive will be used in rendering the scene, and the mask can be compressed using an AND operation to combine adjacent pairs of bits in the mask.

Untransformed Primitive Block Memory

As described above, the untransformed primitive blocks generated by the primitive block generator 409 are stored in memory $402_2$. In some cases, each untransformed primitive block is allocated an equal-sized chunk of the memory $402_2$ in which the untransformed primitive block can be stored. Ensuring that the primitive blocks do not exceed a predetermined amount of memory allows the graphics processing system to know in advance how much memory is required for the primitive blocks and can monitor the memory $402_2$ to anticipate when it will run out of memory and can take action before the memory is totally full. In these cases, if the untransformed primitive block exceeds the allocated amount of memory, one or more portions of the untransformed primitive block may be compressed. For example, the primitive block generator 409 may be configured to compress the expansion transformation stage mask(s) as described above. However, as described above, when an expansion transformation stage mask is compressed information is lost which means that the re-transformation is performed less efficiently than if the expansion transformation stage mask was not compressed. For example, if the original expansion transformation stage mask comprises a bit that indicates that a first sub-primitive will be used in rendering the scene and another bit that indicates that the second sub-primitive will not be used in rendering the scene, then when the untransformed primitives that generated those sub-primitives are re-transformed the rasterization logic may be configured to cull or discard the second sub-primitive without fully transforming it, and fully transform the first sub-primitive. However, if that expansion transformation stage mask is compressed as described above (e.g. by OR-ing pairs of adjacent bits) then the two bits may be replaced by a single bit that indicates that the first two sub-primitives will be used in rendering the scene, then when the untransformed primitives that generated those primitives are re-transformed the rasterization logic may be configured to fully transform both sub-primitives even though the second sub-primitive will not actually be used in rendering the scene. Accordingly, resources may be wasted fully re-transforming the second sub-primitive.

Since the untransformed primitive blocks are variable in size, the inventors have identified that the number of untransformed primitive blocks that are compressed may be decreased, and the memory $402_2$ may be more efficiently used, while still having a predictable amount of memory available for allocation per untransformed primitive block. This is achieved by allocating to each untransformed primitive block a minimum chunk of memory, keeping a running total of the memory that has been allocated to the untransformed primitive blocks and allowing an untransformed primitive block to exceed the amount of available memory per untransformed primitive block so long as the running total of the memory that has been allocated does not exceed the amount of memory that has been available for allocation to all of the untransformed primitive blocks to which memory has been allocated so far for the current render. This means that if an untransformed primitive block did not use all of its allocated chunk of memory a subsequent untransformed primitive block can use its allocated chunk of memory plus the unused portion of the chunk of memory allocated to the previous untransformed primitive block.

Figure 11:
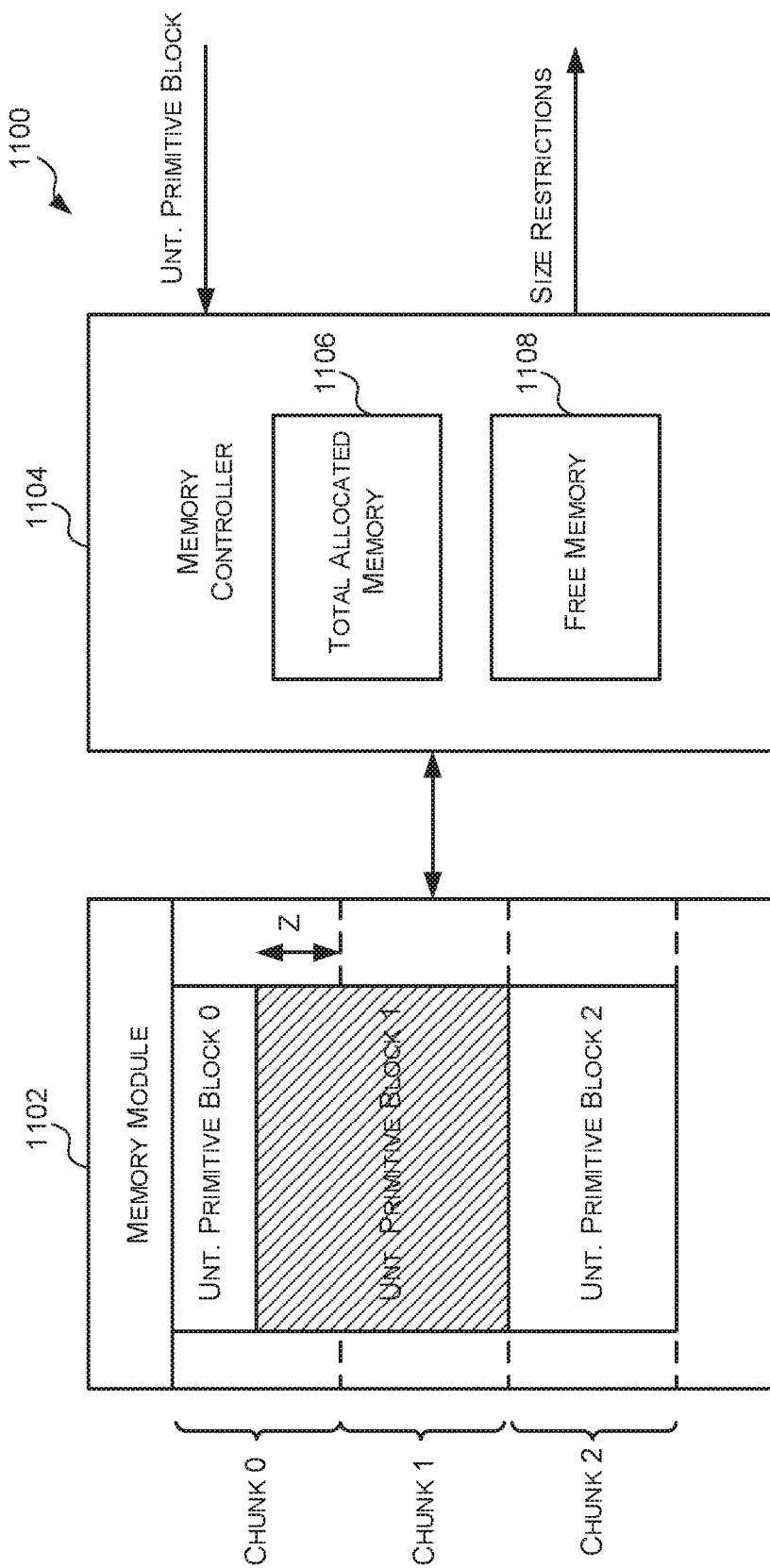
FIG. 11 is a block diagram of an example implementation of the untransformed primitive block memory.

Reference is now made to FIG. 11 which illustrates an example implementation of memory 1100 for storing the untransformed primitive blocks generated by the primitive block generator 409. The memory 1100 may be used to implement the memory $402_2$ shown in FIG. 4. In the example shown in FIG. 11 the memory 1100 comprises a memory module 1102 and a memory controller 1104. The memory module 1102 may be any suitable memory for storing digital information.

The memory controller 1104 is configured to manage the memory so that the total amount of memory used for any n untransformed primitive blocks is not greater than n*chunk_size wherein chunk_size is the amount memory reserved for each untransformed primitive block. The memory controller 1104 may be configured to keep a running total of the memory allocated to the untransformed primitive blocks 1106, and keep track of how much of the total allocated memory is unused or free 1108 and determine whether or not a new untransformed primitive block can be added to the memory module based on the size of the new untransformed primitive block and the amount of unused or free allocated memory. If the size of the new untransformed primitive block is less than or equal to the amount of unused or free allocated memory, then the new untransformed primitive block can be stored in the memory module 1102 uncompressed (i.e. without first compressing one or more portions of the new untransformed primitive block). The memory controller 1104 may be configured to add a new chunk of memory to the total allocated memory each time a new untransformed primitive block is written to the memory module 1102 so that when the $n^{th}$ untransformed primitive block is received at the memory controller 1104 the total allocated memory is n*chunk_size. The portion of the allocated memory that is free will be based on how much of the memory has already been used by the untransformed primitive blocks previously stored in the memory module 1102.

Figure 12:
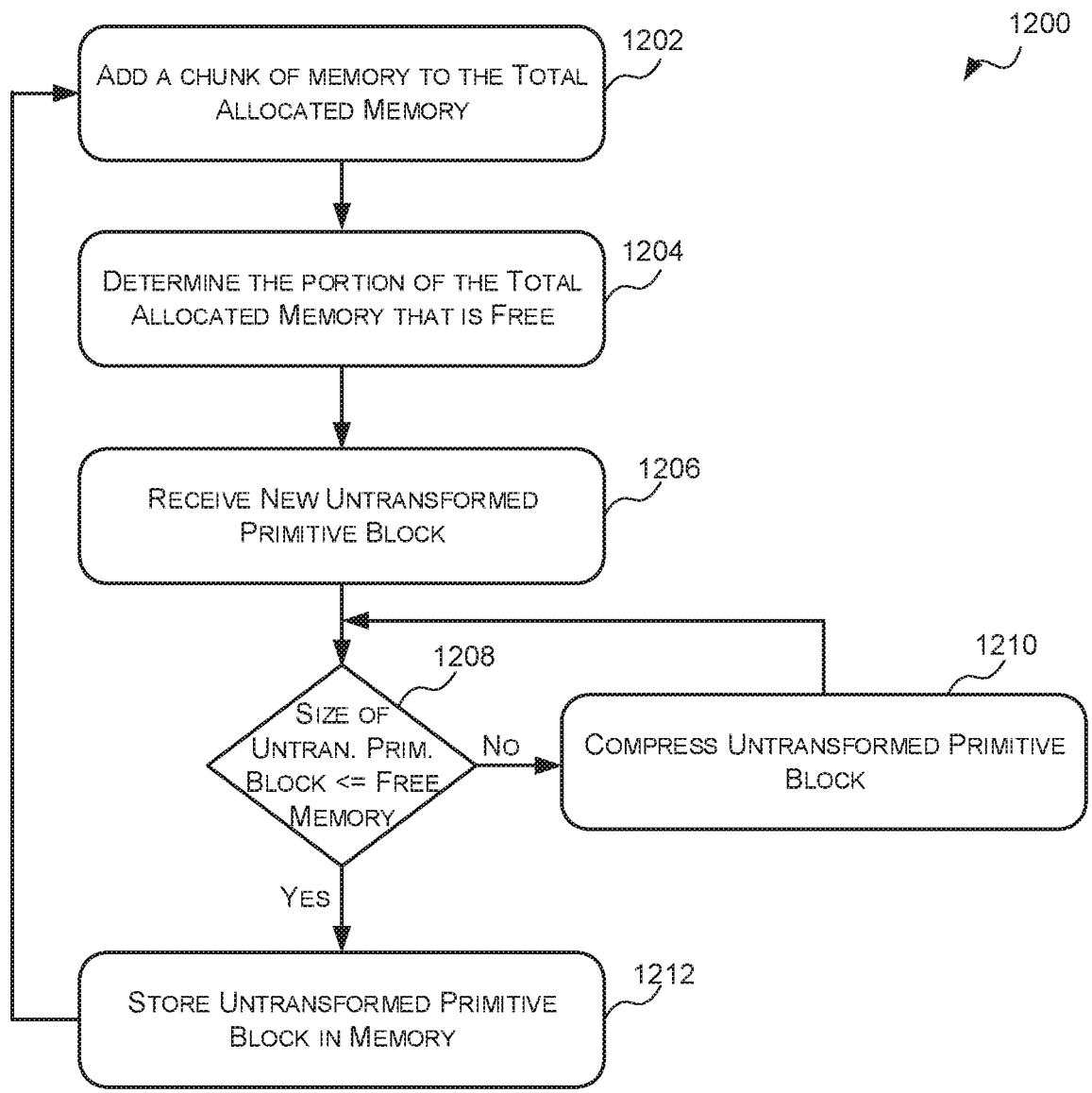
FIG. 12 is a flow diagram of an example method for storing untransformed primitive blocks in the memory shown in FIG. 11.

Reference is now made to FIG. 12 which illustrates an example method 1200 which may be implemented by the memory controller 1104 to manage the memory module 1102. The method 1200 begins at block 1202 where the memory controller 1104 adds a new chunk of memory to the total allocated memory. The total allocated memory represents the amount of memory that has been allocated for the untransformed primitive blocks that have been considered so far for the current render. The size of the chunk of memory that is added to the total allocated memory represents the minimum amount of memory that each untransformed primitive block is entitled to. The size of the chunk of memory (chunk_size) that is added to the allocated memory may be determined empirically. Once a chunk of memory is added to the allocated memory the method 1200 proceeds to block 1204.

At block 1204, the memory controller 1104 determines the portion of the total allocated memory that is free or unused. The memory controller 1104 may be configured to determine the portion of the total allocated memory that is free by subtracting the total amount of the memory module 1102 currently being used to store untransformed primitive blocks from the total allocated memory. Once the portion of the total allocated memory that is free or unused has been determined the method 1200 proceeds to block 1206.

At block 1206, the memory controller 1104 receives a new untransformed primitive block for storage in the memory module 1102. In some cases, the new untransformed primitive block may have been received from a primitive block generator, such as the primitive block generator 409 shown in FIG. 4. Once the memory controller 1104 has received a new untransformed primitive block for storage in the memory module 1102 the method 1200 proceeds to block 1208.

At block 1208, the memory controller 1104 determines whether the size of the received untransformed primitive block is less than or equal to the portion of the allocated memory that is currently free. In other words the memory controller 1104 determines whether the received untransformed primitive block will fit in the portion of the total allocated memory that is free. If it is determined that the size of the received untransformed primitive block is greater than the portion of the allocated memory that is currently free, then the method 1200 proceed to block 1210. If, however it is determined that the size of the received untransformed primitive block is less than or equal to the portion of the allocated memory that is currently free then the method proceeds to block 1212.

At block 1210, the untransformed primitive block is compressed. In some cases, the memory controller 1104 may be configured to cause the untransformed primitive block to be compressed by notifying the primitive block generator 409 that the untransformed primitive block is too large. In some cases, the memory controller 1104 may provide the primitive block generator 409 with information indicating the current portion of the total allocated memory that is free. In response to being informed that an untransformed primitive block is too large the untransformed primitive block generator 409 compresses the untransformed primitive block to generate a compressed untransformed primitive block. Not all portions of the untransformed primitive block may be able to be compressed so the untransformed primitive block generator selects one or more of the portions of the untransformed primitive block that can be compressed and compresses that portion. One portion of the untransformed primitive block that can be compressed is the expansion transformation stage mask(s). However, there may be other portions of the untransformed primitive block that can be compressed, such as, but not limited to other masks. In other cases, the memory controller 1104 itself may perform the compression of the untransformed primitive block. Blocks 1208 and 1210 may be repeated until the size of the compressed untransformed primitive block is less than or equal to the portion of the total allocated memory that is free.

At block 1212, the untransformed primitive block (or the compressed untransformed primitive block) is written to/stored in the memory module 1102. The method 1200 then proceeds back to block 1202 where another chunk of the memory is allocated and the current portion of the total allocated memory that is free is determined in preparation for receiving the next untransformed primitive block.

This method 1200 allows the maximum memory for a set of untransformed primitive blocks to be predetermined yet it also allows the primitive blocks to share memory which allows fewer of the untransformed primitive blocks to be compressed. Specifically, it ensures that the maximum memory for a set of untransformed primitive blocks is capped. For example, as shown in FIG. 11, if a first chunk (chunk 0) is initially added to the total allocated memory making the portion of the total allocated memory equal to one chunk, when a first untransformed primitive block (UPB0) is received at the memory controller 1104 and the size of the first untransformed primitive block (UPB0) is less than one chunk then the first untransformed primitive block (UPB0) may be written to the memory module 1102. A second chunk (chunk 1) is then added to the total allocated memory to make the total allocated memory equal to two chunks (chunk_size*2) and the portion of the total allocated memory that is currently free is equal to one chunk (chunk_size) plus Z wherein Z is the amount by which the first untransformed primitive block is less than one chunk. This means that when a second untransformed primitive block (UPB1) is received it can be larger than a chunk and still be stored in memory without compression. In fact it can be up to chunk_size+Z in size. Yet the total amount of memory used by the two primitive blocks is still equal to chunk_size*2. A third chunk (chunk 2) may then be added to the total allocated memory so that the total allocated memory is three chunks (chunk_size*3) and the portion of the total allocated memory that is currently free is equal to one chunk (chunk_size). This means this if a third untransformed primitive bock (UPB2) is larger than one chunk it will have to be compressed to be stored in the memory module 1102.

Figure 13:
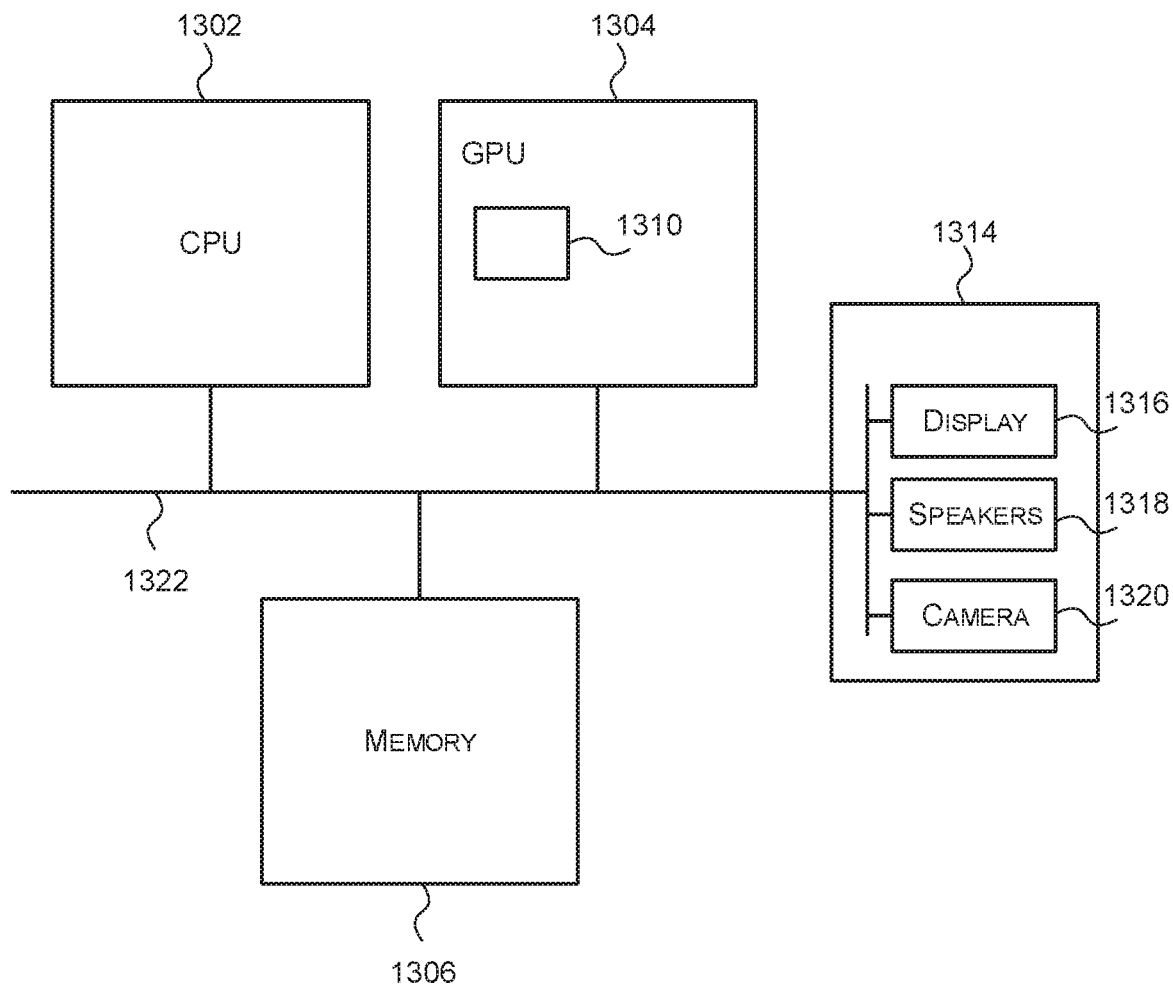
FIG. 13 is a block diagram of an example computer system in which any of the graphics processing systems and/or memories described herein may be implemented.

FIG. 13 shows a computer system in which the graphics processing systems and/or the memories described herein may be implemented. The computer system comprises a CPU 1302, a GPU 1304, a memory 1306 and other devices 1314, such as a display 1316, speakers 1318 and a camera 1320. A block 1310 (corresponding to the graphics processing system 400, or the memory 1100) is implemented on the GPU 1304. In other examples, the block 1310 may be implemented on the CPU 1302. The components of the computer system can communicate with each other via a communications bus 1322.

The graphics processing systems 100, 200, 400, the transformation logic 408, the primitive block generator 409, and the memory 1100 shown in FIGS. 1, 2, 4, 6 and 11 are shown as comprising a number of functional blocks. This is schematic only and is not intended to define a strict division between different logic elements of such entities. Each functional block may be provided in any suitable manner. It is to be understood that intermediate values described herein as being formed by a graphics processing system, transformation logic, primitive block generator, or memory need not be physically generated by the graphics processing system, transformation logic, primitive block generator or memory at any point and may merely represent logical values which conveniently describe the processing performed by the graphics processing system, transformation logic, primitive block generator or memory between its input and output.

The graphics processing systems and memories described herein may be embodied in hardware on an integrated circuit. The graphics processing systems described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, byte-code, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a graphics processing system configured to perform any of the methods described herein, or to manufacture a computing device comprising any apparatus described herein. An integrated circuit definition dataset may be, for example, an integrated circuit description.

Therefore, there may be provided a method of manufacturing, at an integrated circuit manufacturing system, a graphics processing system or a memory as described herein. Furthermore, there may be provided an integrated circuit definition dataset that, when processed in an integrated circuit manufacturing system, causes the method of manufacturing a graphics processing system, or a memory as described herein to be performed.

An integrated circuit definition dataset may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS® and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a graphics processing system or a memory as described herein will now be described with respect to FIG. 14.

Figure 14:
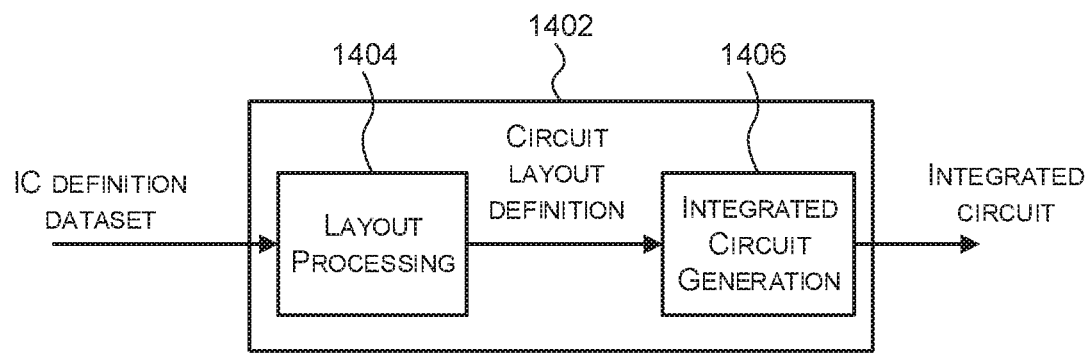
FIG. 14 is a block diagram of an example integrated circuit manufacturing system which can be used to generate an integrated circuit embodying any of the graphics processing systems and/or memories described herein.

FIG. 14 shows an example of an integrated circuit (IC) manufacturing system 1402 which is configured to manufacture a graphics processing system, or a memory as described in any of the examples herein. In particular, the IC manufacturing system 1402 comprises a layout processing system 1404 and an integrated circuit generation system 1406. The IC manufacturing system 1402 is configured to receive an IC definition dataset (e.g. defining a graphics processing system or a memory as described in any of the examples herein), process the IC definition dataset, and generate an IC according to the IC definition dataset (e.g. which embodies a graphics processing system, or a memory as described in any of the examples herein). The processing of the IC definition dataset configures the IC manufacturing system 1402 to manufacture an integrated circuit embodying a graphics processing system or a memory as described in any of the examples herein.

The layout processing system 1404 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1404 has determined the circuit layout it may output a circuit layout definition to the IC generation system 1406. A circuit layout definition may be, for example, a circuit layout description.

The IC generation system 1406 generates an IC according to the circuit layout definition, as is known in the art. For example, the IC generation system 1406 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1406 may be in the form of computer-readable code which the IC generation system 1406 can use to form a suitable mask for use in generating an IC.

The different processes performed by the IC manufacturing system 1402 may be implemented all in one location, e.g. by one party. Alternatively, the IC manufacturing system 1402 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a graphics processing system or a memory as described herein without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 14 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 14, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A method of storing untransformed primitive blocks of variable size in a memory structure of a graphics processing system, the untransformed primitive blocks having been generated by geometry processing logic of the graphics processing system, the method comprising:
   storing an untransformed primitive block in the memory structure, and increasing, by a predetermined amount, a current total amount of memory allocated for storing untransformed primitive blocks;
   determining an unused amount of the current total amount of memory allocated for storing untransformed primitive blocks;
   receiving a new untransformed primitive block for storing in the memory structure, and determining whether a size of the new untransformed primitive block is less than or equal to the unused amount; and
   if it is determined that the size of the new untransformed primitive block is less than or equal to the unused amount, storing the new untransformed primitive block in the memory structure.

2. The method of claim 1, further comprising, if it is determined that the size of the new untransformed primitive block is greater than the unused amount, compressing the new untransformed primitive block.

3. The method of claim 2, further comprising storing the compressed new untransformed primitive block in the memory structure.

4. The method of claim 2, wherein the new untransformed primitive block comprises a mask and compressing the new untransformed primitive block comprises compressing the mask.

5. The method of claim 4, wherein the mask comprises a plurality of bits and compressing the mask comprises performing an OR operation or an AND operation on adjacent pairs of bits.

6. The method of claim 1, wherein the current total amount of memory allocated for storing untransformed primitive blocks at any point in time is equal to (n+1)*chunk_size, wherein n is a number of untransformed primitive blocks stored in the memory structure and chunk_size is the predetermined amount.

7. The method of claim 1, wherein if the size of the new untransformed primitive block is greater than the predetermined amount then the new untransformed primitive block is stored in the memory structure only if the unused amount is greater than the predetermined amount.

8. The method of claim 7, wherein the unused amount is greater than the predetermined amount only if at least one of the untransformed primitive blocks stored in the memory structure has a size that is less than the predetermined amount.

9. The method of claim 1, wherein each of the untransformed primitive blocks comprises information identifying one or more untransformed primitives to be rendered.

10. The method of claim 9, wherein the information identifying an untransformed primitive comprises a pointer to a location of untransformed geometry data in memory defining that untransformed primitive.

11. The method as set forth in claim 1, wherein the steps of storing, determining and receiving are performed by a memory controller.

12. A memory for use in a graphics processing system for storing untransformed primitive blocks of variable size, the untransformed primitive blocks having been generated by geometry processing logic of the graphics processing system, the memory comprising:
a memory module for storing untransformed primitive blocks; and
a memory controller configured to:
cause an untransformed primitive block to be stored in the memory module, and increase a current total amount of memory allocated for storing untransformed primitive blocks by a predetermined amount;
determine an unused amount of the current total amount of memory allocated for storing untransformed primitive blocks;
determine whether a size of a new untransformed primitive block is less than or equal to the unused amount; and
if it is determined that the size of the new untransformed primitive block is less than or equal to the unused amount, cause the new untransformed primitive block to be stored in the memory module.

13. The memory of claim 12, wherein the memory controller is further configured to:
if it is determined that the size of the new untransformed primitive block is greater than the unused amount, compress the new untransformed primitive block; and
cause the compressed new untransformed primitive block to be stored in the memory module.

14. The memory of claim 13, wherein the new untransformed primitive block comprises a mask which comprises a plurality of bits, and wherein the memory controller is configured to compress the new untransformed primitive block by compressing the mask by performing an OR operation or an AND operation on adjacent pairs of bits.

15. The memory of claim 12, wherein the memory is embodied in hardware on an integrated circuit.

16. A graphics processing system comprising the memory of claim 12.

17. A non-transitory computer readable storage medium having stored thereon computer readable instructions that, when executed at a computer system, cause the computer system to perform the method as set forth in claim 1.

18. A non-transitory computer readable storage medium having stored thereon a computer readable description of the memory as set forth in claim 12 that, when processed in an integrated circuit manufacturing system, causes the integrated circuit manufacturing system to manufacture an integrated circuit embodying the memory.

19. An integrated circuit manufacturing system comprising:
a non-transitory computer readable storage medium having stored thereon a computer readable description of the memory as set forth in claim 12;
a layout processing system configured to process the computer readable description so as to generate a circuit layout description of an integrated circuit embodying the memory; and
an integrated circuit generation system configured to manufacture the memory according to the circuit layout description.

* * * * *